Inventor
Richard E. Stobbe
By Cyril M. Hajewski
Attorney

June 23, 1970  R. E. STOBBE  3,517,286
ABSOLUTE POSITION CONTROL CIRCUIT FOR NUMERICALLY
CONTROLLED MACHINE TOOLS
Filed April 10, 1967  5 Sheets-Sheet 3

Inventor
Richard E. Stobbe
By Cyril M. Hajewski
Attorney

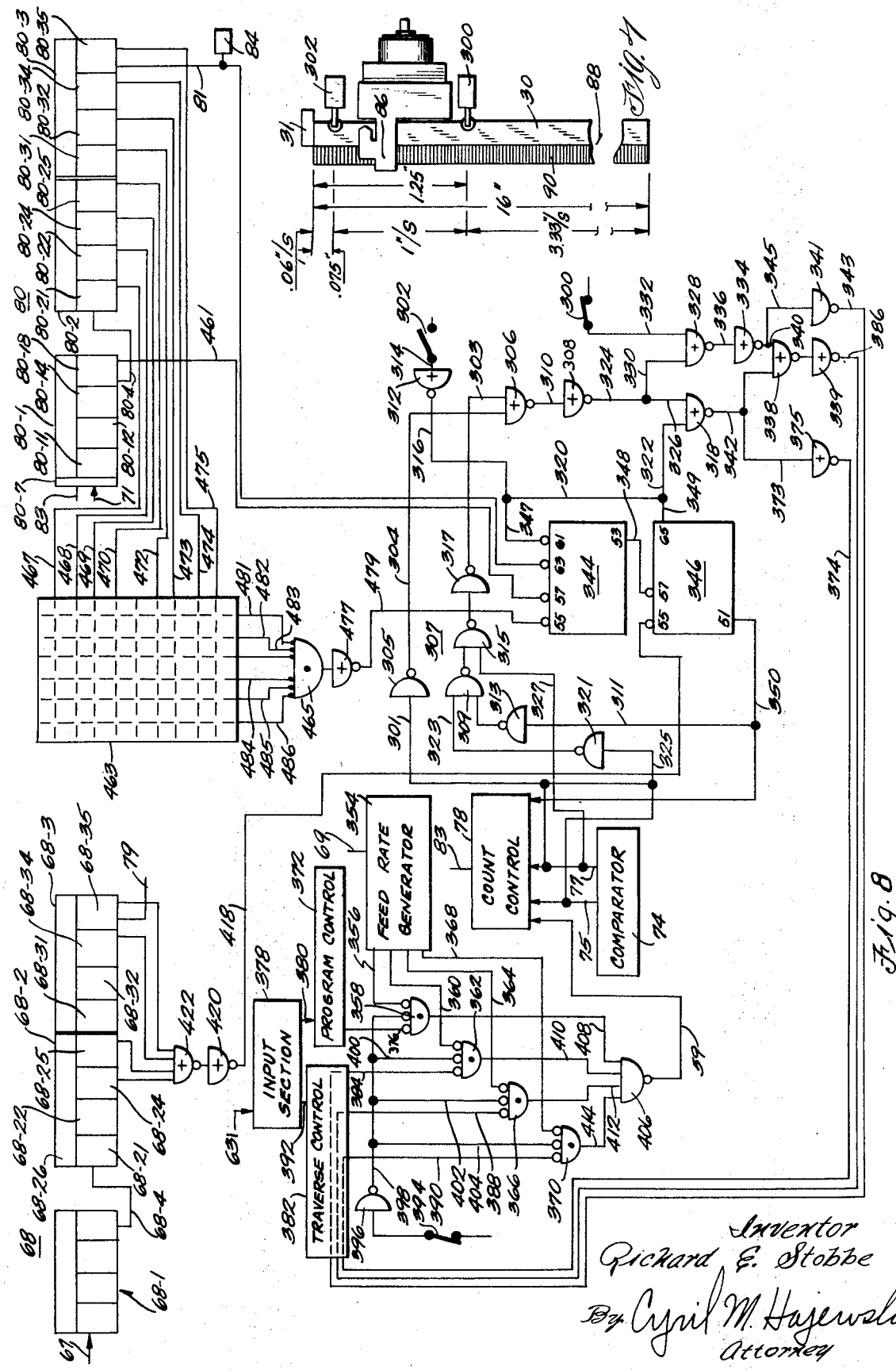

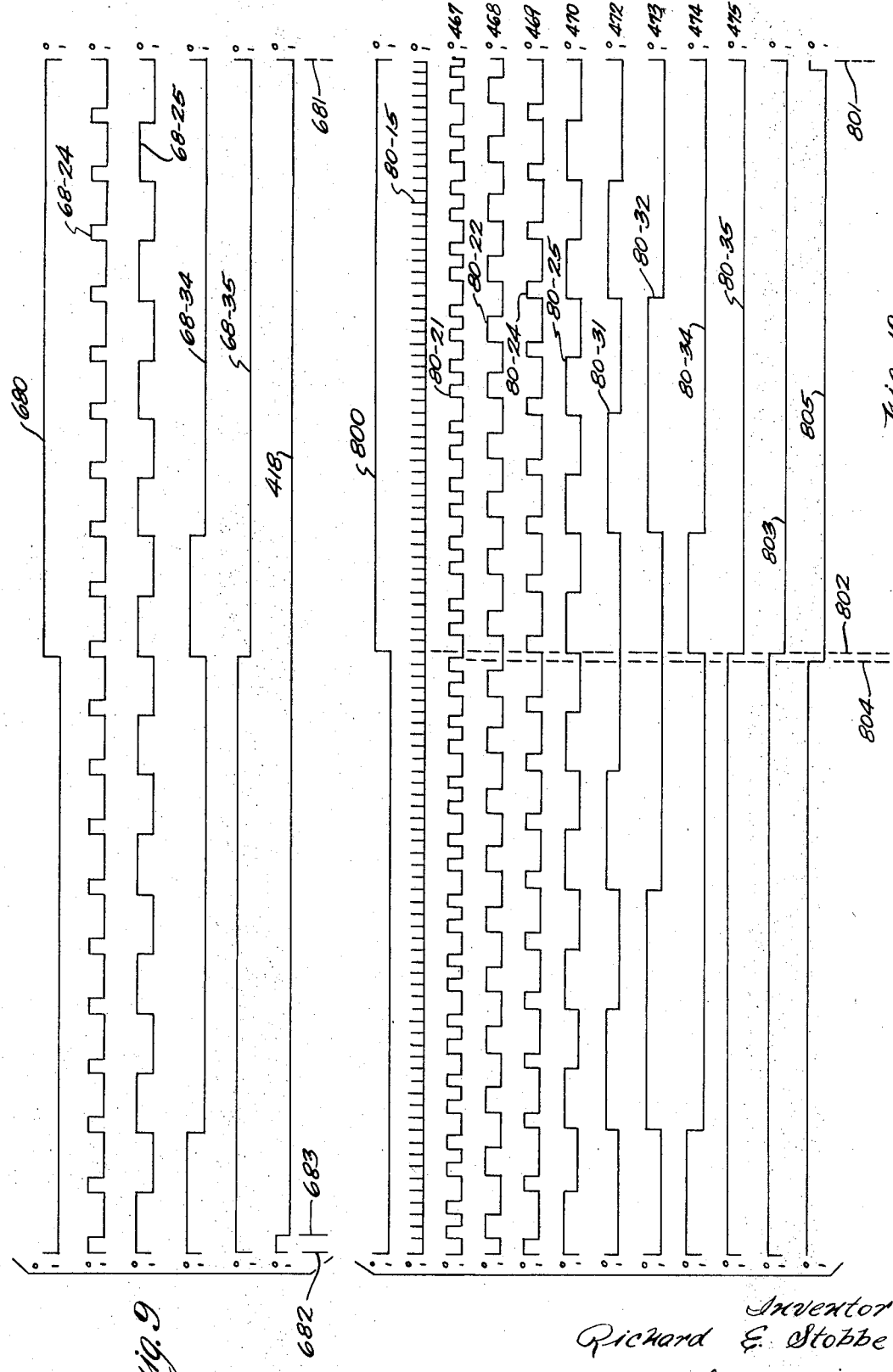

United States Patent Office 3,517,286
Patented June 23, 1970

3,517,286
ABSOLUTE POSITION CONTROL CIRCUIT FOR NUMERICALLY CONTROLLED MACHINE TOOLS
Richard E. Stobbe, Greenfield, Wis., assignor to Kearney & Trecker Corporation, West Allis, Wis., a corporation of Wisconsin
Filed Apr. 10, 1967, Ser. No. 629,464
Int. Cl. G05b; H02p 1/54, 5/46, 7/68, 7/74
U.S. Cl. 318—18                  14 Claims

ABSTRACT OF THE DISCLOSURE

An absolute position control circuit and positioning method for operating the numerical control of a machine tool to position a metal working tool or workpiece along an axis thereof at a desired reference point on the machine tool, hereinafter termed absolute position. The control circuit ascertains the positioning of the metal working tool or workpiece by the control at the reference point of the machine tool independently of the machine tool control and overrides the positioning of the metal working tool or workpiece by the control so as to position the metal working tool or workpiece at the machine tool reference point.

BACKGROUND OF THE INVENTION

Field of the invention

The present invention relates to control circuitry for machine tools.

Description of the prior art

The absolute position control circuit of the present invention is adapted for use with electronically controlled machine tools, often termed numerically controlled machine tools. The expression "numerically controlled" connotes the use of electronic digital control techniques and circuitry, as hereinafter described, to control the operation of the machine tool.

Briefly, a numerically controlled machine tool, such as is shown in FIG. 1, comprises means for moving a metal working tool, such as a drill or milling cutter, and a workpiece with respect to each other along three mutually perpendicular intersecting axes. Such movement is hereinafter termed relative movement of the metal working tool and the workpiece. For instance, the metal working tool and the workpiece may be relatively moved with respect to each other up and down along a vertical axis, relatively moved with respect to each other back and forth along a horizontal axis perpendicular to the vertical axis or relatively moved toward and away from each other along a horizontal axis perpendicular to both the preceding axes.

In the art, the vertical axis is generally termed the Y axis of the machine tool, the horizontal axis perpendicular thereto termed the X axis, and the horizontal axis perpendicular to both the Y and X axes termed the Z axis.

Where the metal working tool and the workpiece come in contact along any of the axes of the machine tool, a metal working operations is performed on the workpiece. For example, a metal working tool in the form of a drill and a workpiece may be moved toward each other along the Z axis of the machine tool to drill a hole in the workpiece. Similarly, a metal working tool in the form of a milling cutter and a workpiece may be moved back and forth with respect to each other along the X axis of the machine tool to mill a horizontal surface of the workpiece.

For mechanical reasons, hereinafter pointed out, it is generally desirable to achieve the relative movement of the metal working tool and the workpiece by the following construction of the machine tool. The metal working tool is mounted for movement along the Y axis, generally in a spindle head containing a rotating tool chuck. The workpiece is stationary along this axis. The workpiece is mounted for movement in both the X and Z axes while the metal working tool is stationary along these axes. The workpiece may be affixed to a table base slideably mounted on rails or ways running along the X and Z axes of the machine tool.

The operation of the machine tool is regulated by an electronic control which controls the relative movement of the metal working tool and the workpiece in both amount and rate or velocity. The amount of relative movement between the metal working tool and the workpiece determines the relative position of the metal working tool and the workpiece and hence is termed position control. Position control determines, for example, the location and depth of holes drilled in the workpiece. Control of the rate of movement between the metal working tool and the workpiece is termed velocity control and determines, for example, the feed rate of a milling cutter applied to a surface of the workpiece.

Where a plurality of machining operations are to be performed on the workpiece, the electronic control may include a means to regulate the machine tool so as to conduct the plurality of machining operations in accordance wtih a predetermined sequential plan. Such a sequential plan is often termed a "program" and is encoded on a medium, such as punched or magnetic tape. The use of such a program, permits the plurality of machining operations to be performed with a rapidity and efficiency far in excess of that attainable with other types of machine tools.

In order to achieve the precision required of most machining operations, it is necessary to accurately locate the metal working tool and the workpiece with respect to each other so as to orient or synchronize the electronic control to the machine tool. The simplest way to obtain such accurate location is to place the workpiece directly on the axes so that movement of the metal working tool or the workpiece is directly along an axis. However, in numerous instances it is not practical or possible to mount the workpiece directly on the axes. Rather, the workpiece is mounted on the table base so as to be offset therefrom. For example, the workpiece may be mounted so as to be raised or offset one inch along the Y axis, with respect to some axis reference point such as the plane of the table base.

With the workpiece mounted on the table base in an offset position from the axis reference point, the orientation or synchronization of the control to the machine tool is destroyed, particularly in instances where the control employs a program based on positioning the workpiece directly on the axes in regulating the machine tool. To restore synchronization to the control and machine tool it is necessary either to prepare a new program which takes the offset position of the workpiece into account or to retain the old program but make an adjustment to the control which compensates for the amount of the offset. As the latter approach is simpler, more economical, and more rapid, it is preferred. The amount of the offset, such as one inch along the Y axis, is measured and a compensating adjustment made to the control so that the offset is accounted for in the relative movements of the metal working tool and the workpiece during the operation of the machine tool. In effect, such an adjustment to the control raises the axis reference point and the entire operation of the machine tool one inch along the Y axis to compensate for the raised position of the workpiece.

While such compensating adjustments to the control provide for satisfactory regulation of the relative movement of the metal working tool and the workpiece, they completely disrupt the operation of the control in regulating the positioning of the metal working tool or the workpiece with respect to a reference point on the machine tool rather than with respect to each other. Such positioning is hereinafter termed absolute positioning of the metal working tool or absolute positioning of the workpiece.

Absolute positioning of the metal working tool or absolute positioning of the workpiece is frequently necessary during the sequential operation of the machine tool. For example, absolute positioning of the metal working tool with respect to a point on the machine tool is necessary on machine tools having automatic tool changing apparatus associated therewith. Such apparatus automatically removes one metal working tool from the chuck of the spindle head and replaces it with a tool from a tool magazine or other storage means. In order to effect such a tool change, it is necessary to move the spindle head and chuck containing the metal working tool to be replaced into an exact position with respect to the tool changing apparatus mounted on the machine tool. The movement occurs along one of the axes of the machine tool, generally the Y axis. The desired absolute position is often the point of maximum upper travel along the Y axis. This position is an absolute position as it is referenced to a point on the machine tool, i.e., the location of the tool changing apparatus.

In addition to the absolute positioning required of the spindle head along the Y axis, it may also be necessary to absolutely position the workpiece along the X and Z axes of the machine tool in order to accomplish certain operations such as the exchange of a machined workpiece for an unmachined workpiece or to prevent collisions between the spindle head and the workpiece.

If the electronic control for the machine tool has undergone compensating adjustments because the workpiece is offset from one or more of the axes, the control, in effect, losses track of the absolute position of the metal working tool or the workpiece with respect to the machine tool due to the adjustments, so that operations such as automatic tool changing cannot be performed. In response to a program command to absolutely position the spindle head in the automatic tool changing position, that is at the point of maximum upper travel along the Y axis, the control attempts to position the spindle head one inch beyond that point due to the offset compensating adjustments. The result is that the spindle head abruptly abuts the stops placed at the end of the Y axis, damaging the spindle head or the stops and causing a loss of synchronization between the machine tool and the control.

Machine tool positioning operations requiring absolute positioning of the metal working tool or the workpiece, such as tool changing, have been accomplished, when the control has undergone compensating adjustments, by one of the following methods. The use of absolute positioning may be abandoned and the relative movement of the metal working tool and the workpiece stopped at some convenient position and the tool changing operation performed by hand. The machine tool may also be stopped at such convenient relative position and moved by means such as a hand crank or jog button into the desired absolute position. Absolute positioning of the metal working tool and the workpiece may be restored after an offset compensating adjustment to the control by making still further corrections to the operation of the control and the machine tool.

The use of a limit switch to sense when the control is in the absolute position has not proven satisfactory because of deceleration problems and because of possible loss of synchronization between the machine tool and the control.

All of the above methods are extremely time consuming and serve to seriously diminish the operating efficiencies of a numerically controlled machine tool, thereby to lessen the salient advantage of such a machine tool over less complex and less expensive tools.

It is, therefore, an object of the present invention to provide an absolute positioning control circuit for inclusion in a machine tool control of the type described above, which permits absolute positioning of the metal working tool or the workpiece when the workpiece is offset from one or more of the machine axes and compensating adjustments are made to the control. Such a position control, in addition to being simple and economical in operation and construction itself, restores the operation of the machine tool to full speed, efficiency, and economy. The absolute position control circuit does not otherwise interfere with the operation of the machine tool.

SUMMARY OF THE INVENTION

The absolute position control circuit of the present invention is adapted for use with a machine tool having an element such as a metal working tool or workpiece, moveable on an axis of the machine tool and positionable along the axis with respect to a reference point on the machine tool. The machine tool has a control, generally of the numerical type, for moving and positioning the element along the axis with respect to the reference point on the machine tool and with respect to a reference point on the axis. The machine tool control may be subject to compensating adjustments due to offset positioning of the workpiece with respect to the axis reference point which prevents the control from positioning the element along the axis with respect to the reference point on the machine tool.

The position control circuit of the present invention provides for the positioning of the element along the axis at a desired position with respect to the reference point on the machine tool when the control has undergone such compensating adjustments.

The position control circuit is connected to the control for the machine tool and is operable to override the positioning of the element by the control so as to position the element along the axis at the reference point on the machine tool, or with respect to such point.

The position control circuit comprises circuit means to ascertain the positioning of the element by the machine tool control at the reference point on the machine tool independently of the machine tool control. Hence, the operation of the position control circuit is unaffected by the compensating adjustments to the control.

To ascertain the positioning of the element by the machine tool control at the reference point on the machine tool, the position control circuit may employ a sensing means mounted on the machine tool and actuatable to the movement of the element by the machine tool control.

The position control circuit may include means connected to the sensing means responsive to the actuation of the sensing means and to the movement of the element by the control, to override the operation of the control when the control has positioned the element at the reference point.

The position control circuit may include a means to define the machine tool reference point independently of the machine tool control so as to permit positioning of the element at that point without regard to compensating adjustments made to the machine tool control.

The positioning of the element at the machine tool reference point may be ascertained by the coincidence of a periodically provided period responsive to the movement of the element by the control and a cyclically provided period, the provision of which is independent of the movement of the element by the control.

The method of the present invention comprises the steps of moving the element along the axis by means of the control, ascertaining when the element has been moved by the control to the machine tool reference point, and overriding the control to position the element along the axis at the reference point.

BRIEF DESCRIPTION OF THE DRAWINGS

FIG. 7 is a partial, somewhat diagramatic view, of one of the axes of the machine tool showing the placement of sensing means employed by the absolute position control circuit along the axis;

FIG. 8 is a detailed schematic diagram of the absolute position control circuit of the present invention, including the pertinent portions of the numerical control of FIG. 2; and FIG. 9 and FIG. 10 are graphs showing pulse train signals empolyed in the operation of the absolute position control circuit of the present invention.

DESCRIPTION OF THE PREFERRED EMBODIMENT

The machine tool

Figure 1:
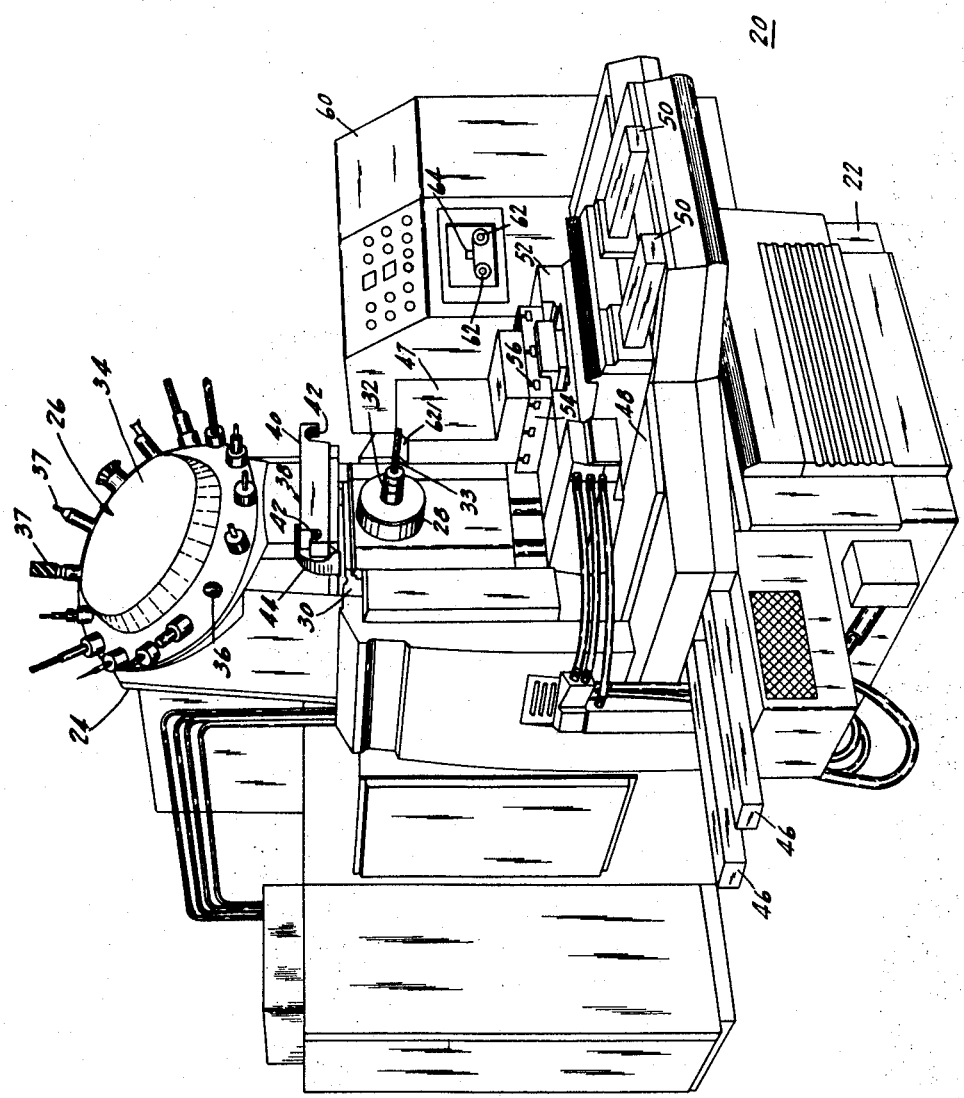
FIG. 1 is a perspective view of a machine tool having a metal working tool and workpiece relatively movable along a plurality of intersecting axes and with which the absolute positioning control circuit of the present invention may be employed.

Referring now to FIG. 1, there is shown therein a typical machine tool 20 of the type with which the present invention may be employed. The machine tool exemplarily shown in that figure is similar to the machine tool manufactured and sold by the Kearney & Trecker Corporation, Milwaukee, Wis. under its trademark, "Milwaukee-Matic," and the designation "Series E." It will be appreciated that the present invention may be employed on other machine tools.

Machine tool 20 includes a bed 22 for positioning the tool on the floor of the work area. Vertical column 24 is mounted in the rear of the bed 22 and extends above the bed to terminate in a tool magazine 26, hereinafter described. Spindle head 28 is slidably mounted on ways 30 on the front surface of column 24 for vertical movement up and down the column. Such vertical movement has been termed movement along the Y axis of the machine tool. Spindle head 28 contains a tool chuck 32 suitable for gripping and retaining metal working tool 33. Chuck 32 is driven in a rotary manner by a hydraulic motor (not shown) or other means.

Tool magazine 26 includes a disc shaped base 34 mounted on column 24 for rotation about its axis. Base 34 contains a plurality of holes 36 in which metal working tools 37 may be inserted for storage. Both the holes 36 and the axis of rotation of base 34 are canted so that the tool 37 in the lowermost hole 36 of the base is positioned parallel to the centerline of chuck 32 in spindle head 28 when the tool is in vertical alignment with the spindle head. Base 34 of tool magazine 26 is indexed in its rotation on column 24 so that each of the tools stored in the magazine may be positioned directly above, and in vertical alignment with, spindle head 28.

Tool changer 38 is mounted on the front of column 24 between tool magazine 26 and spindle head 28. Tool changer 38 is comprised of bar 40 journalled at its center on column 24. Each end of bar 40 contains a hook 42 suitable for engaging the shank of the tools in both the tool magazine 26 and chuck 32. The upwardly open hook 42 may be covered by a guard 44 to keep dirt or other contaminants out of the hook. The length of bar 40 from the center to either hook 42 is such that when the bar is rotated 90° in the clockwise direction from the position shown in FIG. 1, hook 42 engages the shank of metal working tool 37 in the lowermost hole 36 of tool magazine 26.

Tool magazine 26 and tool changer 38 comprise the automatic tool changing apparatus of machine tool 20.

To effect an automatic tool change, tool changer 38 is rotated 90° in a clockwise direction from the position shown in FIG. 1, by hydraulic or other means, so that the hook 42 on one end of bar 40 engages the shank of tool 37 in the lowermost hole 36 of tool magazine 26 while the hook 42 on the other end of bar 40 engages the shank of tool 33 in chuck 32 of spindle head 28. It will be appreciated that, in order for the hook 42 to engage the shank of tool 33 in spindle head 28, spindle head 28 must be properly and accurately positioned on ways 30 and the Y axis of machine tool 20 with respect to tool changer 38. The position of spindle head 28 must be such that the distance from the center of bar 40 to chuck 32 equals the distance from the center of bar 40 to the lowermost hole 36 in tool magazine 26. Such a position of spindle head 28 is an absolute position as it is referenced to the location of tool changer 38 on machine tool 20, rather than to the workpiece. The tool changing position of spindle head 28 may be the point of maximum upper travel of spindle head 28 on ways 30 so that the spindle head 28 abuts the stops provided at the end of ways 30.

Having engaged the shanks of tools 33 and 37, tool changer 38 then extracts the tools from the magazine and the chuck by an outward movement away from column 24. Tool changer 38 is rotated 180°, also in the clockwise direction, to position tool 33 in alignment with the now vacant lowermost hole 36 of tool magazine 26 and to position tool 37 in alignment with chuck 32. An inward movement of the tool changer 38 inserts tool 33 in hole 36 and tool 37 in chuck 32. The tool changing operation is completed by an additional 90° movement of tool changer 38 to return it to its original position and by the rotatable indexing of tool magazine 26 to locate a different tool 37 in the lowermost position.

Tool bed 22 contains a pair of ways 46 positioned in front of column 24. Saddle 48 is slidably mounted on ways 46 for horizontal movement back and forth in front of column 24 and spindle head 28. Such back and forth movement is termed to be along the X axis of the machine tool.

Saddle 48 also contains a pair of ways 50. A table base 52 is mounted on ways 50 for movement toward and away from column 24 and spindle head 28. Such to and from movement of table base 52 along ways 50 has been termed movement along the Z axis of machine tool 20.

Table base 52 includes table 54 fixed thereto on which is fastened workpiece 47, by clamping means engaging T slots 56.

As previously noted, workpiece 47 may be fastened on table 54 so as to be positioned directly on the axes of the machine tool or may be mounted on the table in an offset position. For example, workpiece 47 may be fastened on table 54 so as to be raised or offset one inch in the vertical direction along the Y axis, the plane of table 54 being the zero point along the Y axis.

Figure 2:
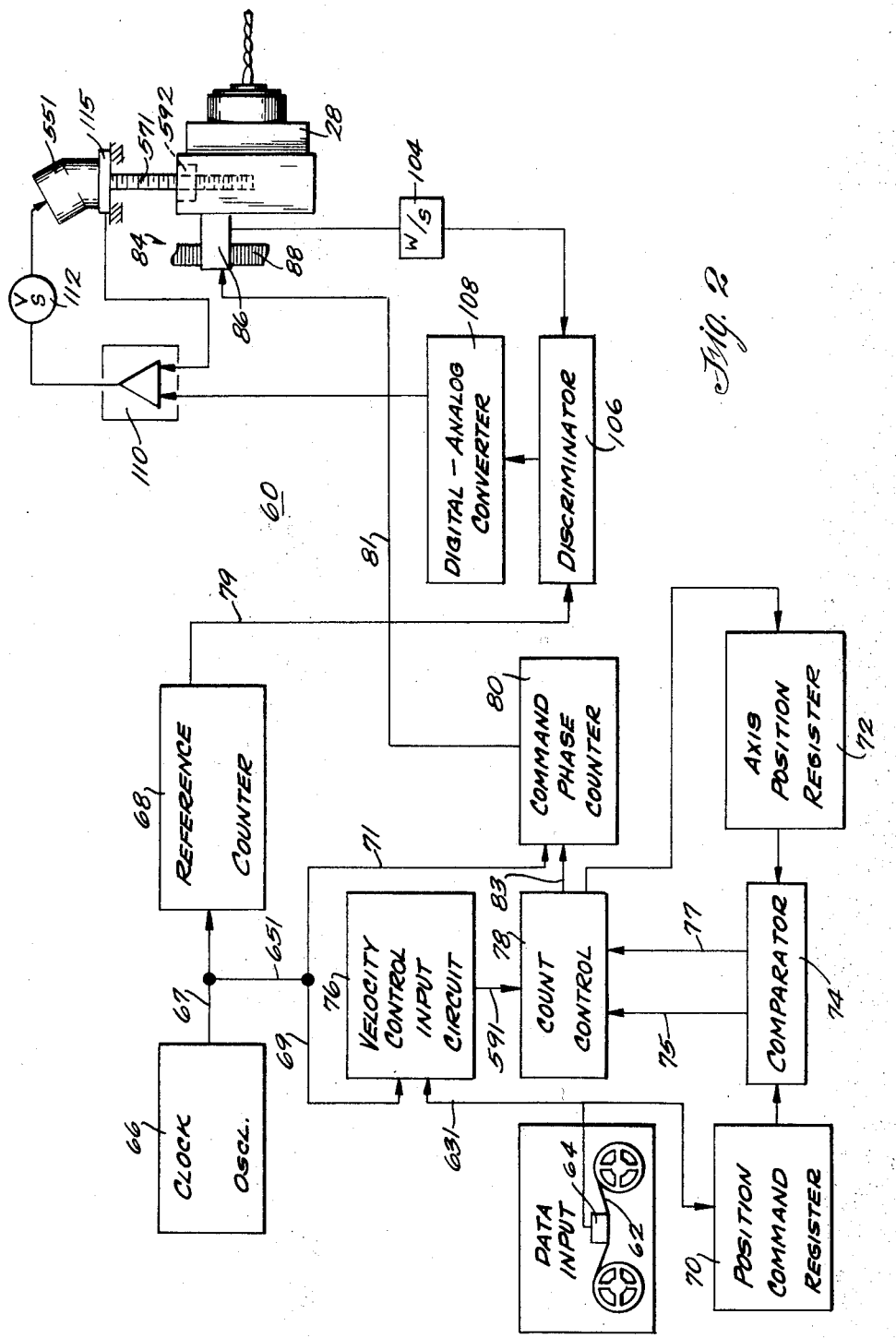
FIG. 2 is a general schematic diagram of a numerical control which may be utilized to control the operation of the machine tool of FIG. 1.

Movement of spindle head 28 up and down ways 30 of column 24 along the Y axis of the machine tool, movement of saddle 48 back and forth in front of column 24 along ways 46 and the X axis of the machine tool, and movement of table base 52 along ways 50 toward and away from column 24, along the Z axis of machine tool 20, may be accomplished by the use of hydraulic motors. Such motors, one of which is shown in FIG. 2 by the numeral 551, are connected to lead screws, such as 571, positioned parallel to each of the ways. The lead screws are threaded through nuts, such as nut 592 connected to spindle head 28 in FIG. 2. Rotation of lead screw 571 in nut 592 by hydraulic motor 551 causes the spindle head 28 to move along ways 30. Similar apparatus is provided on saddle 48 and table base 52 to provide movement to these parts. A hydraulic system containing the customary hydraulic fluid reservoir, hydraulic pumps, piping, valves, and associated control apparatus is housed in bed 22 and column 24 to energize the hydraulic motors.

For additional details of machine tool 20 see Maintenance Manual No. EGM/3-66, published by the Kearney and Trecker Corporation, December 1966.

Although FIG. 1 shows a machine tool 20 in which spindle head 28 is moveable on ways 30 along the Y axis of the machine tool, it will be appreciated that spindle head 28 may be fixedly positioned on column 24 and ways 46 may be mounted on bed 22 for vertical movement with respect to spindle head 28 to provide the required movement along the Y axis.

The operation of machine tool 20 is controlled by a control 60, hereinafter described in greater detail. Control 60 regulates the hydraulic system of the machine tool, and hence the movement of the spindle head, saddle, and table base along the X, Y, and Z axes of the machine, as well as the rotary speed of chuck 32 in spindle head 28, the indexing of tool magazine 26 and the operation of tool changer 38 to provide the desired machining operation to a workpiece located on table 54.

Two general modes of operation are provided to machine tool 20 by control 60. One such mode is termed "position" control or operation and involves conducting plurality of machining operations at one relative position of the metal working tool 33 and workpiece 47. The other mode of operation is termed "contouring" control or operation and involves conducting machining operations at a series of relative positions.

Position control may be used when, for example, it is desired to drill, ream, and tap a horizontal hole at a given position on the workpiece. Control 60 indexes tool magazine 26 so that the hole containing the drill is in the lowermost position. Tool changer 38 is operated by the control to place the drill in chuck 32. Control 60 moves spindle head 28 downward from the absolute position necessary for tool changing. Saddle 48 is moved along the X axis so that the desired location on the workpiece is in alignment with the drill. Control 60 then starts chuck 32 rotating at the desired speed and moves table base 52 along the Z axis toward the rotating drill. Table base 52 continues to move along the Z axis until a hole of the desired depth has been drilled in the workpiece.

Control 60 then moves table base 52 away from column 24 to withdraw the drill from the hole. Tool magazine 26 is indexed so that the hole 36 containing a reamer is in the lowermost position. Spindle head 28 is moved up to the absolute position necessary for tool changing so that tool changer 38 may remove the drill and place the reamer in chuck 32. The drill is inserted in the hole 36 in tool magazine 26 emptied by the removal of the reamer.

Control 60 then moves the spindle head 28 down the Y axis to the desired position, starts chuck 32 rotating at the desired speed, and moves table base 52 along the Z axis toward the reamer to insert the reamer in the hole.

Control 60 operates machine tool 50 in a manner similar to that described above to withdraw the reamer, change tools to place a tap in chuck 32, and tap the hole previously drilled and reamed.

Contouring control may be used when, for example, it is desired to mill a surface on the workpiece, such as diagonal surface 62 on workpiece 47 shown in FIG. 1. control 60 operates tool changer 38 to place a milling cutter 33 in chuck 32. The control 60 then moves spindle head 28, saddle 48, and table base 52 to position the cutter at the starting point on surface 621 as shown in FIG. 1. To perform the milling operation, the control moves saddle 48 to the right along ways 46, and the X axis of the machine, and simultaneously moves spindle head 28 downward along ways 30, and the Y axis of the machine, so that the milling cutter is applied to, and mills, diagonal surface 621. The speed at which saddle 48 moves along ways 40 and the speed at which spindle head 28 moves downward on ways 30 is controlled by control 60 to provide the desired feed rate to the milling cutter 33. The simultaneous movement of saddle 48 and spindle head 28 continues until cutter 33 has traversed the length of surface 621 and the milling operation has been completed. Control 60 then operates machine tool 20 to perform the next operation on surface 621 or to perform a machining operation on some other portion of the workpiece.

The control.—General theory of operation

While numerous types of controls 60 may be employed to control the operation of machine tool 20 in the above described manner, the presently preferred control 60 comprises electronic circuitry utilizing digital techniques of control. Such digital techniques of control employ pulse signals to provide the various controlling and regulating functions to machine tool 20. Digital control differs from analog control in which signal levels, or magnitudes, are used for control purposes. The inherently high degree of accuracy obtainable by digital techniques has resulted in their utilization in machine controls.

To employ digital control techniques, control 60 includes a means to generate the aforementioned pulse signals. These pulses are cyclical in nature with each complete cycle or pulse of the signal representing an increment of movement of the metal working tool or the workpiece. For example, each pulse signal when utilized by control 60 and applied to machine tool 20 may cause .0001 inch of movement of spindle head 28 containing the metal working tool or .0001 inch of movement of saddle 48 or table base 52 mounting the workpiece.

The number of pulses so generated may thus be considered a function of the amount of movement of the metal working tool or workpiece since each pulse causes a certain incremental movement of these elements. Likewise, the rate or frequency at which the pulses are generated is a function of the velocity of the metal working tool or workpiece as the pulse rate represents the number of incremental movements per unit of time.

Control 60 controls the relative position of the metal working tool, the workpiece, spindle head 28, saddle 48, and table base 52 by keeping track of the total number of pulses generated, for example, by feeding the counts to counters or registers. Thus, a counter controlling movement along the Y axis will receive 10,000 counts for each inch of travel of spindle head 28 along that axis. By the use of preset counters or comparators, which provide an actuating signal after the preset count is attained in the counter, control 60 may direct spindle head 28 into a desired location by moving the spindle head until the preset count is recorded on the counter. The actuating signal from the counter is then used to arrest the movement of the spindle head.

In a similar manner, control 60 controls the velocity or rate of movement of spindle head 28 along the Y axis by means of circuitry responsive to the frequency at which the pulses are generated, or the pulse rate. The responsive circuitry moves spindle head 28 through the number of incremental movements per unit of time corresponding to the pulse rate.

Input circuitry

As previously noted, the greatest efficiency in the operation of machine tool 20 is obtained by preparing a sequential plan of operation for the machine tool to include the required positions along each of the axes, rates of movement along the axes, and tools and tool speed required to sequentially perform each of the desired machining operations. Such a program is encoded or punched on tape 62 so as to provide data input signals to control 60 by means of tape reader 64.

In addition to the tape reader 64, the input circuitry to control 60 includes clock oscillator 66. See FIG. 2. Clock oscillator 66 produces stable high frequency pulse signals, for example, a pulse train having a frequency of 250 kilocycles per second. Each pulse of this pulse train when employed by control 60 represents .0001 inch of movement of the metal working tool or workpiece. The pulse signals from clock oscillator 66 are in the form of symmetrical square waves; that is, the interval of each pulse signal, or the pulse width, is equal to the interval between pulses.

The pulses are formed by periodically changing the output state of clock oscillator 66 from one state to another state. For example, the clock oscillator may initially provide no output signal, then provide an output signal for the interval of a pulse, then revert to a state of providing no output signal for a similar interval, then provide an output signal for the interval of a second pulse and so on. As previously noted, only the provision of the output signal is important to digital control, not the magnitude thereof. In digital control terminology, the two states of the output signal of the clock oscillator and other components of control 60 are termed the logic 1 signal state and the logic 0 signal state. It may be noted that depending on the type of digital control technique utilized the logic signal state may or may not correspond to the electrical signal state. Thus, a logic 1 signal may indicate the presence of an actual electrical signal as described above, or may indicate the absence of an actual electrical signal.

The output from clock oscillator 66 is supplied to other portions of control 60 and to reference counter 63, via conductor 67. Reference counter 68 produces a plurality of lower frequency of pulse signals which are employed by the other components of control 60.

For reasons of simplicity, FIG. 2 shows the position control circuitry and the velocity control circuitry for only one axis of movement of machine tool 20. Thus, the position control circuitry and the velocity control circuitry for controlling and regulating the position and velocity of spindle head 28 along the Y axis of machine tool 20 are shown in the figure. It will be appreciated that similar control circuitry is employed in conjunction with saddle 48 and table base 52 to control and regulate movement along the X and Z axes of the machine tool.

Position control circuitry

Tape reader 64 provides a position command signal to position command register 70. This input signal presets that register or counter in accordance with the desired position of spindle head 28 on the Y axis. Since one pulse signal or count from clock oscillator 66 represents .0001 inch of movement, to command a movement of spindle head 28 one inch along the Y axis, 10,000 counts must be added or subtracted to the count on position register 70. Whether the counts will be added or subtracted depends on the desired direction of movement of spindle head 28.

Command position register 72 includes a means by which the count existing on the register may be altered to provide compensating adjustments to control 60 when workpiece 47 is mounted in an offset position along the Y axis. In the previously used example wherein workpiece is raised one inch along the Y axis, 10,000 counts may be added to the position command register to restore proper orientation and synchronization to control 60.

The position control circuitry also includes an axis position register 72 which records the actual movement of spindle head 28 in terms of the pulse signals representing .0001 inch of movement. The pulse signals or counts are supplied to axis position register 72 in a manner hereinafter described.

The output signal from position command register 70 and axis position register 72 are supplied to a comparator 74 which determines whether the number of counts in the axis position register 72 is greater or less than the number of counts in the position command register 70. Comparator 74 provides an output signal to conductor 75 indicating whether the number of counts in the axis position register 72 is greater or less than the number of counts in the command position register 70. When the number of counts in the axis position register 72 equals the number of counts in the command position register 70, indicating that spindle head 28 is in the command position, comparator 74 provides a signal in conductor 77 which operates control 60 to stop the movement of spindle head 28.

Velocity control circuitry

As previously noted, control 60 employs the frequency at which the pulses representing .0001 inch of movement are generated to control the velocity of spindle head 28. As control 60 moves spindle head 28 .0001 inch for every such pulse generated, the greater the number of pulses generated per unit of time, the greater the number of incremental movements per unit of time and the greater the velocity of spindle head 28.

To detect the frequency or rate at which pulses are being generated, the velocity control circuitry of control 60 employs a pair of low frequency pulse trains as carrier signals. One of the carrier signals is utilized as a reference signal. The phase of this signal remains constant. The other carrier signal is responsive to the rate of pulse generation and the phase of this other carrier signal may be phase shifted at a rate equal to the rate of pulse generation.

As the rate of change of the phase shift difference between the constant phase reference carrier signal and the phase shifted carrier signal is equal to the rate of pulse generation, this rate of change may be detected and a signal corresponding thereto provided to the hydraulic motor energizing spindle head 28 to move spindle head 28 through the required number of incremental movements per unit of time. A feed back signal is provided in the velocity control circuitry of control 60 to indicate actual movement of spindle head 28, also in terms of a phase shift of the second carrier signal. In the normal manner of a regulator, the feed back signal operates to shift the phase of the carrier into conformity with the phase of the reference carrier signal, thereby indicating that the spindle head 28 is moving at the desired velocity.

The velocity control circuitry of control 60 includes a velocity control input circuit 76 which receives and stores the velocity input command signals from tape reader 64, via conductor 631.

The velocity control input circuitry 76 also receives the high frequency pulse signals from clock oscillator 66, via conductors 651 and 69. These high frequency pulse signals are formed by velocity control input circuit 76 into an output pulse train, the frequency, or rate of pulse generation, of which corresponds to the desired speed of spindle head 28. For example, velocity control input circuit 76 may reduce the 250 kilocycle per second pulse train of clock oscillator 66 to a 10 kilocycle per second output signal. The 10 kilocycle per second frequency of this signal represents a desired speed of one inch per second of spindle head 28, since 10,000 pulses are being generated each second, each pulse being equal to .0001 inch of movement of spindle head 28.

The pulse train output signal of velocity control input circuit 76 in conductor 591 and the output signals from comparator 74 are supplied to count control circuit 78. Count control circuit 78 thus receives an input signal relating to the desired rate of movement of spindle head 28, as provided by the 10 kilocycle per second pulse train from velocity control input circuit 76 and a signal relating to the direction of such movement, as provided by comparator 74. Circuit 78 provides on output signal in conductor 83 in response to the input signals thereto which controls the operation of command phase counter 80.

Command phase counter 80 generates the second or phase shifted carrier signal employed by the velocity control circuitry of control 60. Command phase counter 80 receives the 250 kilocycle per second pulse train from clock oscillator 66, via conductor 651 and 71 and divides this 250 kilocycle per second input signal by 1,000 to produce a 250 cycle per second low frequency pulse train carrier signal. The input signal from count control circuit 78 operates command phase counter 80 to advance or retard the phase of the 250 cycle per second carrier signal at a rate equal to the frequency of the pulse train signal from velocity control input circuit 76. The direction in which the signal is shifted, that is, whether the signal is advanced or retarded in phase, is determined by a signal from comparator 74 to count control circuit 78 and determines the direction of movement of spindle head 28.

To advance or retard the phase of the 250 cycle per second carrier signal from command phase counter 80, the pulse train signal from count control 78 is employed to affect the divide by 1,000 operation of command phase counter 80, and specifically, the application of the 250 kilocycle per second pulses from clock oscillator 66 to the counter. If, as in the previously used example, it is desired to move spindle head 28 at a velocity of one inch per second, the phase of the 250 cycle per second carrier signal must be phase shifted by a total of 10,000 pulses over the time period of a second. The 250 cycle per second carrier signal of command phase counter 80 must be phase shifted one pulse every 100 microseconds in order to provide the required phase shift rate of 10,000 pulses per second. It may be noted that a phase shift of 10,000 pulses represents a phase shift of ten complete pulses of 250 cycles per second carrier signal.

This phase shift is provided by utilizing the 10,000 cycle per second pulse train signal from count control 78 to affect the application to command phase counter 80 of one pulse out of every 25 pulses of the 250 kilocycle per second, or 250,000 cycle per second, clock oscillator 66 pulse train. If it is desired to retard the phase of the 250 cycle per second carrier signal of command phase counter 80, the 10,000 cycle per second pulse signal, from count control 78 in conductor 83 will block one out of every 25 clock oscillator pulses supplied to command phase counter 80, thereby retarding the generation and phase of the carrier signal provided by command phase counter 80 by the amount of the one blocked clock oscillator pulse. Over the period of a second, 10,000 clock oscillator pulses supplied to command phase counter 80 will be blocked, thus providing the desired rate of change, or phase shift, to the 250 cycle per second carrier signal of command phase counter 80. If it is desired to advance the phase of the 250 cycle per second carrier signal of command phase counter 80, the 10,000 cycle per second pulse signal from count control 78 will operate command phase counter 80 to add the equivalent of one clock oscillator pulse every 25 clock oscillator pulses supplied to command phase counter 80, thereby advancing the phase of the carrier signal by the amount of the added clock oscillator pulse.

As each of the 250 kilocycle per second clock oscillator pulses added or blocked in the advancing or retarding the 250 cycle per second carrier signal of command phase counter 80 by count control 78 represents .0001 inch of movement of spindle head 28, a signal corresponding to the additional or blocking of these pulses is supplied to axis position register 72 which records the movement of spindle head 28. The movement of spindle head 28 and the addition or removal of pulses to axis position register 72 will be such as to bring the number of pulses recorded in axis position register 72 into conformity with the number of pulses recorded in position command register 70. Thus, if 10,000 pulses have been added to the number of counts in position command register 70, commanding one inch of movement of spindle head 28 along the Y axis, 10,000 pulses will be added to axis position register 72 by the resulting action of count control circuit 78.

The phase shifted signal from command phase counter 80 in conductor 81 is fed to transducer 84. Transducer 84 is responsive to the actual movement of spindle head 28 along ways 30 and provides a phase shift to the output signal from command phase counter 80 proportional to this movement. This phase shift to the output signal of command phase counter 80 is opposite to the phase shift provided by count control 78 as it indicates actual movement of spindle head 28.

A transducer suitable for use as transducer 84 is that made and sold by the General Electric Company under the trade name "Accupin." Transducer 84 includes sensor 86 and actuating means 88. Sensor 86 and actuating means 88 are mounted on spindle head 28 and ways 30 so as to be responsive to the movement of spindle head 28 along ways 30. For example, sensor 86 may be mounted on spindle head 28 while actuating means 88 is mounted on ways 30. See FIG. 7.

Figure 3:
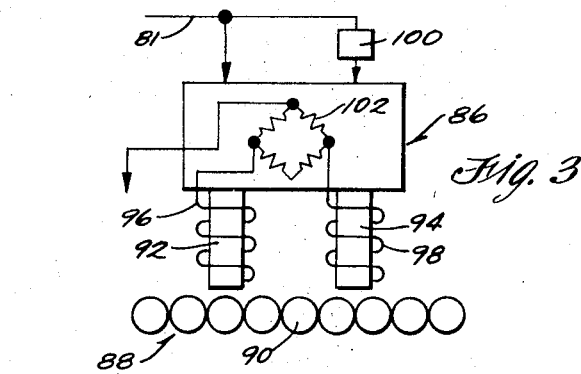
FIG. 3 is a detailed, somewhat schematic, view of a circuit means used to sense the movement of the metal working tool or the workpiece along the axes of the machine tool.

The actuating means 88 of transducer 84 may consist of a plurality of parallel metal rods or pins, mounted in abutting relation to each other perependicular to the direction of travel of spindle head 28. Sensor 86 is mounted on spindle head 28 so that it passes over the rods as spindle head 28 moves along ways 30. Rods 90 may be .1 inch in diameter so that 10 rods occupy 1 inch along ways 30 or along the Y axis machine tool 20. See FIG. 3.

Sensor 86 comprises a pair of sensing heads 92 and 94 which are mounted in close proximity to rods 90. The rods are positioned on sensor 86 so that when one head is directly over a rod 90, the other head is directly over the trough between two adjacent rods. Energizing windings 96 and 98 surround each of sensing heads 92 and 94. Winding 96 surrounding head 92 is energized by the phase shifted carrier signal of command phase counter 80 while winding 98 surrounding pin 94 is energized by a signal 90° out of phase with the carrier signal of command phase counter 80. The 90° phase shift may be produced by phase shift circuit 100.

The signals in both windings 96 and 98 are summed or mixed, in a resistor network 102 and an output signal provided therefrom.

As will be appreciated, when either head 92 or 94 is directly over rod 90, the magnetic permeability presented to that head is of a small value due to the proximity of the road to the head and a large signal is supplied to the resistive network from the winding on that head. When, however, either head 92 or 94 is directly over the trough between rods 90, the magnetic permeability presented to that head is of a larger value, due to the large air gap adjacent to the head, and a small signal is supplied to the resistive network from that head. The output signal from resistive network 102 and from transducer 84, and more particularly, the phase of the output signal of the transducer, is determined by the relative magnitude of the two signals supplied to, and summed by, resistive network 102.

As heads 92 and 94 move from one rod 90 to the next, the phase of the output signal from transducer 84 is shifted. Initially, the signal from head 92 predominates, then the phase shifted signal from head 94 predominates, and at the completion of the movement to the next rod, the signal from head 92 again predominates. This phase shifting of the output signal of transducer 84 is applied to the already phase shifted carrier signal of command phase counter 80 and acts to restore the 250 cycle per second signal from command phase counter 80 to its original phase.

The output signal from transducer 84 is supplied through a wave shaper 104 to discriminator 106. Wave shaper 104 restores the signal from transducer 84 to a pulse train signal. Discriminator 106 also receives a 250 cycle per second signal from reference counter 68 in conductor 79. The 250 cycle per second signal to discriminator 106 from reference counter 68 forms the reference carrier signal. The phase of the reference carrier signal remains constant. Discriminator 106 acts to determine the phase difference between the constant phase reference carrier signal from reference counter 68 and the phase shifted feedback signal from transducer 84 and to supply a digital difference signal corresponding to the difference between the phase of the two signals to digital to analog converter 108.

Digital to analog converter 108 converts the digital difference signal between the constant phase reference signal and the phase shifted feedback signal into an analog output signal proportional to the digital difference signal and capable of operating servo amplifier 110. Servo amplifier 110, in turn, operates servo valve 112 and hydraulic motor 551 connected to lead screw 571, to move spindle head 28 fastened to nut 592 along the screw at a velocity corresponding to the frequency of the pulse train output signal of velocity control input circuit 76. Tachometer 115 connected to hydraulic motor 551 and servo amplifier 110 assists in the control of the velocity of spindle head 28.

A control 60 of the type described above is made and sold by the General Electric Co. under the designation 100S or 120S and is described in Machine-Control Manual, No. GME–65 published by the Kearney & Trecker Corporation, dated Dec. 1, 1966.

Absolute position control circuit

Absolute position control circuit 200 employs a plurality of logic elements which operate in a coincidental manner to change the logic state of their output depending on the logic state of one or more inputs to the elements. The logic elements employed in the absolute position control circuit 200 of the present invention include those termed in the art NOR gates, NAND gates and flip-flops.

The first mentioned element, that is, a NOR gate, is a coincident element which provides a logic 0 output when an input of the logic state of 1 is supplied to its first input, or its second input, or its third input, etc. The name NOR gate is derived from the "not" or logic 0 characteristic of the output and the "or" characteristic of the inputs.

Figure 4A:
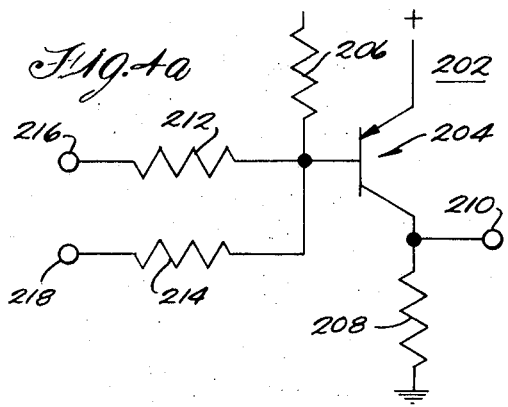
FIG. 4A and FIG. 4B are a circuit diagram and a schematic diagram, respectively, of a NOR gate coincident element which may be employed in the absolute positioning control circuit of the present invention.
Figure 4B:
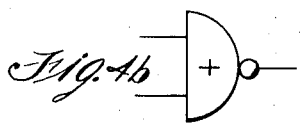

A typical NOR gate 202 is shown in FIG. 4A. The schematic symbol representing the NOR gate circuit of FIG. 4A is shown in FIG. 4B. NOR gate 202 includes transistor 204 biased into the on or conductive state, by the potential between its emitter and collector and by resistors 206 and 208. The output of NOR gate 204 is supplied to terminal 210 from the collector of transistor 204. The base of transistor 204 has attached thereto parallel resistors 212 and 214. The input terminals 216 and 218 of NOR gate 202 are connected to resistors 212 and 214.

In operation, with no input signal to terminal 216 or terminal 218, transistor 204 is biased into the conductive state by the emitter-collector potential and resistors 206 and 208. The lack of an input signal at either terminal may be considered a logic 0 signal. With transistor 204 in the conductive state an output signal is applied to output terminal 210. Such an output signal may be considered a logic 1 signal.

When an input signal, or logic 1 signal, is supplied to either input terminal 216 or input terminal 218, transistor 204 is biased into the non-conducting state removing the output signal from output terminal 210 and causing a logic 0 signal to appear at that terminal. Thus, with a logic 1 signal on input terminal 216 or on input terminal 218, no output signal, that is, a logic 0 output signal, is supplied to output terminal 210 thereby providing the NOR characteristics to gate 202. While only two input terminals 216 and 218 are shown in FIG. 4A, it will be appreciated that additional input terminals and resistors may be added to the base terminal of transistor 204 in parallel with the terminals and resistors shown.

Another commonly used logic element incorporated in absolute position control circuit 200 is the NAND gate. As employed herein, the NAND gate utilizes the same logic as a NOR gate; that is, the NAND gate provides a logic 1 output signal only when there is a logic 0 input signal to its first input terminal, and its second input terminal, and its third input terminal, etc.

Figure 5A:
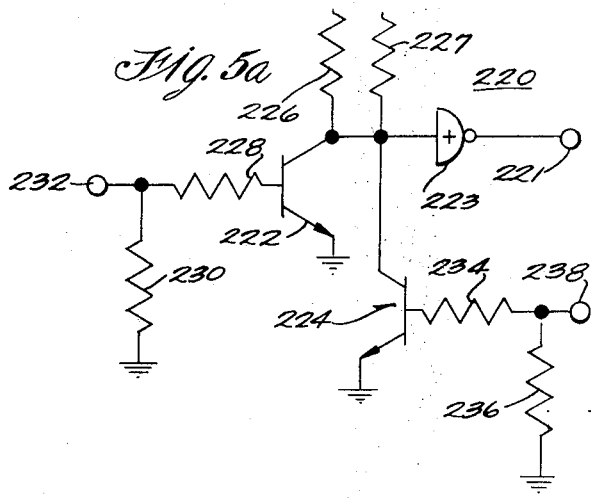
FIG. 5A and FIG. 5B are a circuit diagram and a schematic diagram, respectively, of a NAND gate coincident element which may be employed in the absolute position control circuit of the present invention.
Figure 5B:

A typical circuit which may be employed as NAND gate 220 is shown in FIG. 5A. The schematic symbol for NAND gate 220 shown in FIG. 5A is shown in FIG. 5B. As the logic of NAND gate 220 is the same as the logic of NOR gate 202, the circuit shown in FIG. 5A may be employed as a NAND gate. NAND gate 220 is comprised of two, parallel connected, transistors 222 and 224. The collector terminal of transistor 222 is connected through resistor 226 to a potential. The output terminal 221 of NAND gate is also connected to the collector of transistor 222, through NOR gate 223. The base of transistor 222 is connected through biasing resistors 228 and 230 to input terminal 232.

The collector terminal of transistor 224 is connected through resistor 227 to a potential and to output terminal 221. The base of transistor 224 is connected through biasing resistors 234 and 236 to input terminal 238.

In operation, when logic 0 signals are applied to input terminal 232 and to input terminal 238, neither transistor 232 or transistor 224 will be rendered conductive and no signal will be provided to NOR gate 223. This logic 0 signal is inverted by NOR gate 223 to provide a logic 1 signal at output terminal 221. When a logic 1 input signal is applied to both terminal 232 and terminal 238, both transistors 222 and 224 will be rendered conductive, applying a logic 1 signal to NOR gate 223 which, when inverted by NOR gate 23, provides a logic 0 signal at terminal 221. If a logic 1 input signal is applied to terminal 232 but a logic 0 input signal is applied to terminal 238, or vice versa, one or the other of transistors 222 or 224 will be rendered conductive, and placing a logic 1 signal at the input of NOR gate 223 and the logic 0 signal at the output of NOR gate 223 and the output terminal 221. Thus, a logic 0 input signal must be applied both to input terminal 232 and to input terminal 238 for a logic 1 output signal to issue from the output terminal 221. Again, although only two input terminals are shown for NAND gate 220, it will be appreciated that additional input terminals may be supplied to the NAND gate by connecting additional transistors in parallel with transistors 222 and 224.

A third commonly used logic element associated with the absolute positioning control circuit 200 is a flip-flop. A flip-flop includes a pair of gates, such as the NOR gates described above, and serves as a memory element due to its ability to retain the state of its output signal until it receives one or more signals which cause a change in its output. When changing the state of its output signal, the flip-flop may be set to "flip" to the new signal state. When the state of the output signal reverts to the original state, the flip-flop is said to "flop" back into the original state.

Figure 6A:
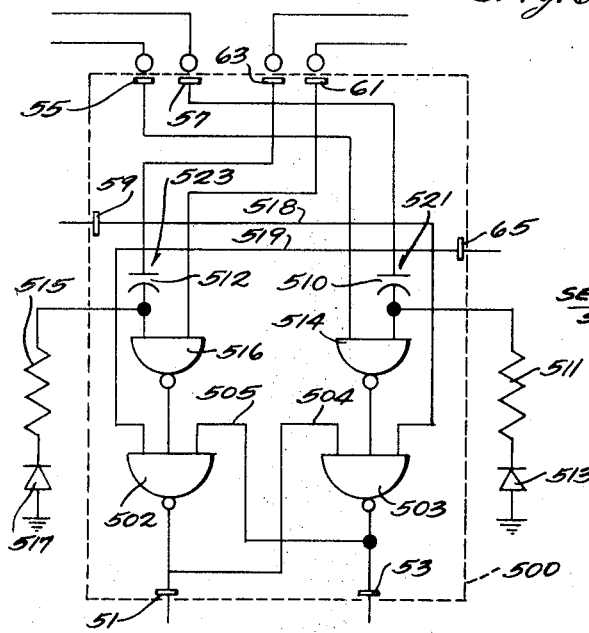
FIG. 6A and FIG. 6B are a circuit diagram and a schematic diagram, respectively, of a flip-flop coincident element which may be employed in the absolute position control circuit of the present invention.
Figure 6B:
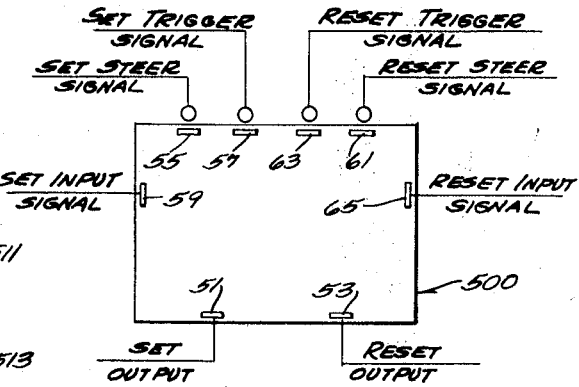

Referring initially to FIG. 6B, there is shown therein a schematic diagram of a flip-flop 500, including the various input and output signals thereof. The input and output signals to the flip-flop may be divided into two general groups; the "set" input signals controlling the "set" output and the "reset" input signals controlling the "reset" output signal. The set output signal and the reset output signal are mutually exclusive so that if a signal having the logic state of 1 appears at the set output terminal 51, a signal having the logic state of 0 must appear at the reset output terminal 53, and vice versa. When, for example, the set output signal goes from a logic 1 state to a logic 0 state, the reset output goes from a logic 0 state to a logic 1 state. When the set output goes from a logic 0 state to a logic 1 state, the reset output goes from a logic 1 state to a logic 0 state.

The state and change of the set output signal at the set output terminal 51 is controlled by three input signals; the set steering signal applied to terminal 55, the set trigger signal applied to terminal 57, and the set input signal applied to terminal 59.

The set steering signal applied at terminal 55 is so termed because it controls or steers the operation of the flip-flop. Thus, the steering signal applied to terminal 55 of flip-flop 500 must be a logic 0 signal for the flip-flop to be operated by the set trigger signal applied to terminal 57. If the set steering signal at terminal 55 to flip-flop 500 is a logic 1 signal, the set output signal at terminal 51 will remain in the previous state, whatever that state may be, regardless of the set trigger signal applied to terminal 57. A set steering signal of the logic state of 1 is said to block the flip-flop. Further, when the set steering signal at terminal 55 is a logic 0 signal, and the set trigger signal applied to terminal 57 is a logic 0 signal or changes from a logic 0 signal state to a logic 1 signal state, the set output signal at terminal 51 also remains in its previous state.

When, however, the set steering signal is in the logic 0 signal state and the set trigger signal applied to flip-flop 500 at terminal 57 changes from a logic 1 signal state to a logic 0 signal state, the set output signal at terminal 51 assumes the logic 1 signal state, if it is not already in that state. As the set output signal at terminal 51 and the reset output signal at terminal 53 are mutually exclusive, the reset output signal goes to the logic 0 signal state when the set output signal goes to the logic 1 signal state. If the set trigger signal remains a the logic 0 signal state or changes from a logic 0 signal state to a logic 1 signal state, no change in the set output signal at terminal 51 occurs.

The set input signal to terminal 59 is not controlled or steered by the set steering signal so that any time the set input signal to terminal 59 assumes the logic 1 signal state, the set output signal at terminal 51 becomes a logic 1 signal and the reset output signal at terminal 53 becomes a logic 0 signal.

The reset steering signal applied to terminal 61, the reset trigger signal applied to terminal 63, and the reset input signal applied to terminal 65 operate flip-flop 500 in the same manner as the corresponding set signals described above to control the signal state of the reset output signal at terminal 53 of flip-flop 500.

FIG. 6A shows a schematic diagram of a circuit which may comprise flip-flop 500. The circuit includes a pair of NOR gates 502 and 503. The output of NOR gate 502 is connected to terminal 51 and provides the set output signal of flip-flop 500. NOR gate 503 is connected to terminal 53 and provides the reset output signal of flip-flop 500. To provide the mutual exclusivity between the set output signal at terminal 51 and the reset output signal at terminal 53, the output of NOR gate 502 provides an input signal to NOR gate 503 and the output of NOR gate 503 provides an input signal to NOR gate 502, via conductors 504 and 505, respectively, so that when, for example, NOR gate 502 is providing an output signal of the logic 1 state to set output signal terminal 51, the same signal is supplied to the input of NOR gate 503 to cause the reset output signal at terminal 53 to be of the logic 0 signal state.

The input signals controlling the state of the set output signal at terminal 51, that is, the set steering signal, the set trigger signal, and the set input signal, are connected to NOR gate 503. NOR gate 503 controls the state of the set output signal at terminal 51 through conductor 504 and NOR gate 502. Specifically, the set input signal at terminal 59 is supplied directly to NOR gate 503 via conductor 518. The set steering signal applied to terminal 55 and the set trigger signal applied to terminal 57 are supplied through an intermediate NOR gate 514, the output of which is connected to NOR gate 503. The set trigger signal applied to terminal 55 is passed through a circuit element 521 which provides an output signal only when the signal applied to element 521 changes from the logic 1 signal state to the logic 0 signal state. Under these conditions, the state of the output signal of element 521 also changes from the logic 1 signal state to logic 0 signal state. Such a circuit element is shown diagrammatically as capacitor 510, resistor 511, and grounded diode 513. Diode 513 and resistor 511 apply a logic 1 signal to NOR gate 514 except when the state of the set trigger signal applied to capacitor 510 changes from logic 1 to logic 0. This signal change charges capacitor 510 so as to overcome the logic 1 signal applied to NOR gate 514 by the resistor and diode and apply a logic 0 signal thereto.

NOR gate 502 is provided with input signals in the same manner as NOR gate 503. Specifically, the reset input signal applied to terminal 65 of flip-flop 500 is supplied directly to NOR gate 502 by conductor 519. The reset steering signal and the reset trigger signal applied to terminals 61 and 63, respectively, are supplied to an intermediate NOR gate 516, the output of which is provided to NOR gate 502. The reset trigger signal applied to terminal 63 is passed through a circuit element 523 which performs the same function as element 521 described above. The latter element is comprised of capacitor 512, resistor 515, and grounded diode 517.

The operation of flip-flop 500 may be explained as follows. Assume flip-flop 500, in the initial state, is in the set condition. The signal at set output terminal 51 is of the logic 1 signal state and the output signal of NOR gate 502 is thus of the logic state of 1. The output signal of NOR gate 502 is supplied, via conductor 504, to the input of NOR gate 503, forcing the output of that gate and the reset output signal at terminal 53 to be a logic 0 signal. The logic 0 output signal from NOR gate 503 is supplied to the input of NOR gate 502 via conductor 505.

Assuming the set input signal to terminal 59 and the reset input signal to terminal 65 are at the logic 0 signal state, the logic 0 signal is supplied to NOR gate 503 from terminal 59 and a logic 0 signal is supplied to NOR gate 502 from terminal 65. Assuming that set steering signal and the reset steering signal at terminals 55 and 61, respectively, are at the logic state of 1, these signals apply logic 1 signals to NOR gates 514 and 516. The set trigger signal and the reset trigger signal at terminals 57 and 63, respectively, may also be assumed to be at the logic state of 1. Grounded diodes 513 and 517, provide logic 1 signals to NOR gates 514 and 516, respectively, causing the output signals of these gates to be of the 0 logic state.

Thus, the input signals to NOR gate 502 from reset input signal terminal 65, NOR gate 516, and NOR gate 503, are all of the logic state of 0, forcing the output of that gate to the logic state of 1 and providing a logic 1 output signal to terminal 51. The input signal to NOR gate 503 from set input signal terminal 59 and the input signal to NOR gate 503 from NOR gate 514 are both of the logic state of 0 but the input signal from NOR gate 502 is of the logic state of 1, causing the output signal of NOR gate 503 and the reset output signal at terminal 53 to be logic 0.

If the reset steering signal applied to terminal 61 changes from the logic state of 1 to the logic state of 0, one of the two input signals to NOR gate 516 goes to the 0 logic state. The state of the output signal of NOR gate 516 does not change as diode 517 continues to provide a logic 1 signal to the gate.

When the reset trigger signal at terminal 63 goes to the logic 0 state, a second logic 0 signal is momentarily applied to NOR gate 516 through capacitor 512. As both the input signals to NOR gate 516 are now of the 0 logic state, the state of the output signal of this gate goes to the logic state of 1. This causes the output signal of NOR gate 502 to go to the logic 0 state, forcing the set output signal at terminal 51 of flip-flop 500 to the 0 logic state.

The logic 0 signal of NOR gate 502 is supplied to NOR gate 503 which, since it now has all of its input signals at the logic state of 0, supplies a logic 1 output signal to terminal 53. This signal comprises a reset output signal of flip-flop 500. The flip-flop has been "flipped" from the set condition to the reset condition. The logic 1 output signal of 503 is supplied to NOR gate 502, via conductor 505, to insure that the gate continues to issue a logic 0 output signal.

The set steering signal and the set trigger signal applied to terminals 55 and 57, respectively, operate flip-flop 500 in an analogous manner to "flop" the flip-flop back to the set condition from the reset condition.

The set input signal at terminal 59 may also be used to accomplish the same purpose. Thus, if a logic 1 signal is applied to set input signal terminal 59, a logic 1 input signal is provided to NOR gate 503, which causes the output signal of the gate and the reset output signal at terminal 53 to revert to the logic 0 state. The output signal to terminal 51 and the output of NOR gate 502 goes to the logic 1 signal state.

Mechanical construction of absolute position control circuit

FIG. 7 shows the mechanical details of absolute position control circuit 200 utilized in the absolute positioning of spnidle head 28 along ways 30 and the Y axis of machine tool 20 so as to permit, for example, an automatic tool changing operation to occur. Such absolute position may be the point of maximum upper travel of spindle head 28 and for the machine tool 20 shown in FIG. 1 may be an absolute position of 16.000 inches along the Y axis. When at the point of maximum upper travel, spindle head 28 will abut stop 31.

A pair of switches are mounted adjacent ways 30 so as to be actuated by the movement of spindle head 28. Switch 300 is termed the slowdown switch. The function of this normally closed switch is to insure that spindle head 28 will be moving at a relatively slow speed in the upward direction as it approaches the desired absolute position. The positioning of this switch is dependent on the maximum speed of spindle head 28. In a typical case where the maximum speed of spindle head 28 is 3.33 inches per second, switch 300 will be located 1.25 inches from the desired absolute position or at 14.75 inches along ways 30.

The second switch 302 may be termed the tool change limit switch. The function of switch 302 is to indicate when spindle head 28 is within .1 inch of the desired absolute position. Thus, the tool change limit switch 302 is located approximately .075 inch from the desired absolute position or at 15.925 inches along ways 30.

The remainder of absolute position control circuit is comprised of a plurality of coincident elements, as described above.

Velocity control circuitry

Referring now to FIG. 8, NOR gate 306 receives, at its input terminals a signal indicating whether spindle head 28 is at the desired position along the Y axis of machine tool 20 and a signal indicating whether the spindle head is moving in the upward direction along the axis. The signal indicating whether the spindle head 28 is moving in the upward direction, sometimes hereinafter referred to as the "up signal," is supplied to NOR gate 306 by conductor 304 from conductor 75 of comparator 74. The signal in conductor 75 reflects whether the count on position command register 70 is greater than the count on axis position register 72, indicating that spindle head 28 is to move up, or whether the count on position command register 70 is less than the count on axis position register 72, indicating that spindle head 28 is to move down. The signal from conductor 75 in conductor 301 is niverted by NOR gate 305 so that a logic 0 signal is supplied in conductor 304 to NOR gate 306 when spindle head 28 is moving upward along the Y axis.

The signal indicating whether spindle head 28 is at the desired position, sometimes hereinafter referred to as the "in position signal" is basically supplied to NOR gate 306 by conductor 303 from conductor 77 of comparator 74. The signal in conductor 77 reflects whether the count on the axis position register 72 equals the count on command position register 70 indicating that spindle head 28 is in the commanded position. In accordance with standard digital techniques, a logic 1 signal will appear in conductor 303 when spindle head 28 is in the desired position.

However, as the desired absolute position of spindle head 28 may not be the commanded position, due to the offset compensating adjustments to control 60, it is necessary to provide circuitry 307 which generates an in position signal when spindle head 28 is at the desired absolute position as well as when it is at the commanded position. This in position signal may hereinafter be termed the "false in position signal."

Circuitry 307 includes NOR gate 309 which receives an input signal from conductor 75 of comparator 74 through conductor 325, NOR gate 321 and conductor 323. NOR gate 309 also receives the output signal from absolute position control circuitry 200 in conductor 350 via conductor 311 and inverting gate 313.

The output of NOR gate 309 is supplied to NOR gate 315 along with the signal in conductor 77 in conductor 327. The output of NOR gate 315 is supplied through inverting gate 317 to conductor 303 and NOR gate 306.

The output of NOR gate 306 is supplied to NOR gate 308 via conductor 310.

The signal generated by the opening and closing of tool change limit switch 302, shown schematically in FIG. 8, is supplied to NOR gate 312 by conductor 314. The output of NOR gate 312 is supplied to conductor 316.

The output of NOR gate 312 in conductor 316 is supplied to the input of NOR gate 318 via conductors 320 and 322. NOR gate 318 also receives an input from NOR gate 308 via conductors 324 and 326. The output of NOR gate 318 is supplied to conductor 374 via conductors 342 and 373 and NOR gate 375.

The NOR gate 308 provides an input to NOR gate 328 via conductors 324 and 330. The second input to NOR gate 328 is the signal generated by the opening and closing of slow down switch 300 provided to conductor 332.

The output of NOR gate 328 is provided to inverting NOR gate 334, via conductor 336, and thence to NOR gate 338 via conductor 340. The output of NOR gate 318 is supplied directly to NOR gate 338 via conductor 342. The output of NOR gate 338 is supplied to conductor 386 through inverting gate 339. The signal is conductor 340 is passed through inverting gate 341 to conductor 343.

The output from NOR gate 312 in conductor 316 is supplied as an input signal to flip-flop 344 by conductor 347. Specifically, the signal in conductor 347 forms the reset steering signal for flip-flop 344. Flip-flop 344 may be termed the command phase flip-flop and forms part of the position control circuitry, hereinafter explained. The output from NOR gate 312 in conductor 316 is supplied, via conductors 320 and 349, to the reset input terminal of flip-flop 346, hereinafter termed the stop Y axis flip-flop. This flip-flop is also part of the position control circuitry.

The output signals from NOR gates 318, 338, and 341, in conductors 374, 386, and 343, are supplied to velocity control input circuit 76, shown in detail in FIG. 8. As previously noted, velocity control input circuit 76 provides a pulse train output to count control 78. The frequency of the pulse train output is proportional to the desired speed of spindle head 28 and is produced in response to velocity command signals from tape reader 64 to input section 378, via conductor 63.

In a typical embodiment of control 60, velocity control input circuit 76 provides a plurality of predetermined velocities to spindle head 28, for moving the spindle head between machining operations and the like, as well as a velocity corresponding to the desired or programmed machining feed rate of spindle head 28 along the axis. The predetermined velocities may, for example, be a rapid traverse speed of 3.3 inches per second, a fast traverse speed of 1 inch per second, and creep speed of .066 inch per second.

Pulse trains having frequencies corresponding to the above described velocities are produced by feed rate generator 354. Feed rate generator 354 is supplied with the 250 kilocycle per second pulse train from clock oscillator 66, via conductors 65, 67, and 69, and produces a plurality of lower frequency pulse trains corresponding to the desired velocities. For example, the frequency of the pulse train providing the fast traverse velocity of 1 inch per second will have a frequency of 10 kilocycles per second.

The pulse train output signal of feed rate generator 354 corresponding to the programmed feed rate is provided in conductor 356 to NAND gate 358. The pulse train output signal of feed rate generator 354 corresponding to the rapid traverse speed is provided in conductor 360 to NAND gate 362. The pulse train output signal of feed rate generator 354 corresponding to the fast traverse speed is provided in conductor 364 to NAND gate 366. The pulse train output signal of feed rate generator 354 corresponding to the creep speed is provided in conductor 368 to NAND gate 370.

NAND gate 360 receives an input from program control 372 via conductor 376. Program control 372 is operable by the signal from input section 378 in conductor 380. NAND gates 362, 366, and 370, receive inputs from traverse control 382 via conductors 384, 388, and 390, respectively. Traverse control 382 is operable by the signal from input section 378 in conductor 392.

The outputs of absolute position control circuit NOR gates 341, 339, 374, are connected to traverse control 382.

NAND gates 358, 362, 366, and 370, also receive an input signal from stop switch 394 through inverting gate 396 and conductors 398, 400, 402, and 404.

The outputs of NAND gates 358, 362, 366, and 370, are supplied as input signals to NOR gate 406, via conductors 408, 410, 412, and 414. The output of NOR gate 406 is supplied to conductor 59 and count control 78.

Position control circuitry

As previously noted, the stop Y axis flip-flop 346 receives the signal from tool change limit switch 302, via NOR gate 312 and conductors 316, 320, and 349, at its reset input terminal 346–65. This signal holds stop Y axis flip-flop 346 in the reset state until tool change limit switch 302 is actuated by spindle head 28.

The set steering signal applied to set steering terminal 346–55 is comprised of a signal from reference counter 68, via conductor 418. The reference counter 68 provides the low frequency pulse train reference carrier signal to discriminator 106. This carrier signal is of a 250 cycle per second frequency. The period of the carrier signal is 4 milliseconds. During the 4 millisecond period of the 250 cycle per second carrier signal, one thousand 250 kilocycle per second pulses from clock oscillator 66 are generated. The period of the latter pulses is 4 microseconds.

The set steering signal from reference counter 68 permits stop Y axis flip-flop 346 to be set during the terminal portion of each pulse of the reference carrier signal. Specifically, set steering signal may permit the flip-flop to be set during the last 1/100 of each pulse of the carrier signal or for the last 40 microseconds of the 4 millisecond period. This last 1/100, or terminal portion, of each pulse is used in the defining of the absolute position along the Y axis by control circuit 200 as hereinafter described.

While the provision of the last 1/100 of each pulse has been described above, a portion other than a 1/100 or a portion other than the terminal portion may be used if desired or necessary.

The generation of the stop Y axis set steering signal may be more fully understood by reference to FIG. 8 showing, in detail, reference counter 68. The 250 kicocycle per second output pulse train from clock oscillator 66 is supplied to reference counter 68 by means of conductor 67. This pulse train is formed by the alternation of the clock oscillator output signal between the logic 1 signal state and the logic 0 signal state. Reference counter 68 produces a plurality of lower frequency square wave pulse signals, also alternating between the logic 1 signal state and the logic 0 signal state which are employed by the other components of control 60. Reference counter 68 is comprised of a three decade decimal counter. The first decade 68–1 of the counter divides the 250 kilocycle per second pulse train in conductor 67 by ten so that the output signal in conductor 68–4 to the second decade 68–2 of reference counter 68 is a 25 kilocycle per second square wave signal. The second decade 68–2 of reference counter 68 also divides by ten, as does the third decade 68–3 so that the output signal of the third decade in conductor 79 is the 250 cycle per second reference carrier signal pulse train supplied to discriminator 106.

Each decade of the reference counter 68 may be comprised of four, serially connected, flip-flops, and the necessary coincident circuit or gates, to convert the operation of the flip-flops into the decimal operation required by the decade counters. For example, the second decade counter 68–2 of reference counter 68 may be comprised of flip-flops 68–21, 68–22, 68–24, and 68–25, and gate circuitry 68–26.

Output signals are provided from each of the flip-flops in decade 68–2. These signals are of frequencies intermediate to the 25 kilocycle per second input frequency and the 2.5 kilocycle per second output frequency of the decade. Specifically, the output signal frequency of flip-flop 68–21 is 10 kilocycles per second. The output signal frequency of flip-flop 68–22 is 5 kilocycles per second and the output signal frequency of flip-flop 68–24 is also 5 kilocycle per second. The output signal frequency of flip-flop 68–25 is the 2.5 kilocycle per second output signal of the second decade 68–2 of reference counter 68 to the third decade 68–3 of the counter.

The output signal frequency of flip-flop 68–31 of third decade 68–3 of reference counter 68 is 1 kilocycle per second or 1,000 cycles per second. The output frequency of flip-flop 68–32 is also 1,000 cycles per second. The output signal frequency of flip-flop 68–34 is 500 cycles per second. The output frequency of flip-flop 68–35 is the 250 cycle per second reference carrier signal.

Each flip-flop in the decades of reference counter 68 provides two output signals, one at the set output terminal and one at the reset output terminal. The pulse train signal at the reset output terminal is inverted with respect to the pulse train signal at the set output terminal.

To produce stop Y axis flip-flop 346 set steering signal, the inverted outputs of flip-flops 68–24, 68–25, 68–34, and 68–35 are provided to NOR gate 422.

The inverted output signals at the reset output terminals of the aforesaid gates are shown in FIG. 9, and designated with a corresponding number. A single pulse 680 of the reference carrier signal is also shown. The reference carrier signal is produced at the set output terminal of flip-flop 68–35. The right side of FIG. 9, that is, point 681 represents the start of the reference carrier signal pulse 680 and the left side, point 682 of FIGURE 9 represents the terminal portion thereof.

An inspection of FIG. 9 will reveal that only during the last 100th of reference carrier signal pulse 680 will all of the inputs to NOR gate 422 be of the logic 0 signal state so as to cause a logic 1 signal to appear at the output of the NOR gate. The last 1/100 of the pulse is between points 683 and 682. The last 100 of the reference carrier 680 occupies a time period of 40 microseconds. The last 100 of reference carrier signal 424 occupies the period of generation of 10 clock oscillator pulses, specifically, the 990 to 1,000 clock oscillator pulses generated during the period of the carrier signal.

The output signal from NOR gate 422 is inverted by NOR gate 420 so as to provide a logic 0 signal to set steering terminal 344–55, via conductor 418 during the last 100 of the reference carrier signal pulse 420. The signal in conductor 418 is indicated by the graph in FIG. 9 having the same number.

The set output terminal 346–51 of stop Y axis flip-flop 346 is connected to conductor 350 which is connected to count control 78. When a signal of the logic state of 1 appears at the set output terminal 346–51 of stop Y axis flip-flop 346, count control 78 is operated to override the operation of control 60 and stop the phase shifting of the phase shifted carrier signal from command phase counter 80 to arrest the movement of spindle head 28.

The set trigger signal of stop Y axis flip-flop 346 at terminal 346–57 is the reset output signal of command phase flip-flop 344 in conductor 348.

The command phase flip-flop 344 received the signal from tool change limit switch 302 via NOR gate 312 and conductors 316, 302, and 349, at its rest steering input terminal 344–61. The remainder of the input signals to command phase flip-flop 344 are generated by command phase counter 80.

Command phase counter 80 is similar in construction and operation to reference counter 68. As such, it utilizes the 250 kilocycle per second signal supplied thereto from clock oscillator 66 by conductor 71 to produce a plurality of lower frequency pulse signals. However, the pulse signals from command phase counter 80 are inverted with respect to the corresponding signals from reference counter 68. Command phase counter 80 is comprised of a 3 decade decimal counter. The output of the third decade 80–3 of the counter in conductor 81 is the 250 cycle per second phase shifted carrier signal pulse train to transducer 84. Command phase counter 80 includes input circuitry 80–7 operable by the signal from count control 78 in conductor 83 to advance or retard the phase of the lower frequency output signals of command phase counter 80.

Each decade 80–1, 80–2, and 80–3, of command phase counter 80 may be comprised of four, serially connected, flip-flops and the necessary coincident circuitry or gates.

The first decade 80–1 of command phase counter 80, comprised of flip-flops 80–11, 80–12, 80–14, and 80–18, receives the phase shifted 250 kilocycle per second pulse train from input circuitry 80–7 and provides a 25 kilocycle per second output signal in conductor 80–4. The 25 kilocycle per second output signal is provided from the set output terminal of flip-flop 80–18.

The 25 kilocycle per second signal from the reset output terminal of flip-flop 80–18 is connected via conductor 461, to the set trigger terminal 344–57 of command phase flip-flop 344. The 25 kilocycle per second signal alternates between the logic 1 signal state and the logic 0 signal state once every ten clock oscillator 66 pulses supplied to decade 80–1 as a result of the divide by ten operation performed by decade 80–1. Specifically, the 25 kilocycle per second signal from the reset output terminal of flip-flop 80–18 in conductor 461 is at the logic state of 1 for the first 8 clock oscillator pulses. At the end of the eighth pulse, the signal in conductor 461 from the reset output terminal of flip-flop 80–18 goes to the logic state of 0 and remains there for the ninth, and tenth clock oscillator pulses. At the end of the tenth pulse, the reset output terminal signal in conductor 461 reverts to the logic 1 signal state. The signal in conductor 481 thus attempts to set command phase flip-flop every ten clock oscillator 66 pulses or every 40 microseconds when the state of the signal changes from the logic 1 signal state to the logic 0 signal state.

Output signals are provided from each of the flip-flops and decade 80–2. These signals are of frequencies intermediate to the 25 kilocycle per second input frequency and the 2.5 kilocycle per second output frequency. Specifically, the output signal frequency of flip-flop 80–21 is 10 kilocycles per second, the output signal frequency of flip-flop 80–22 is 5 kilocycles per second and the output signal frequency of flip-flop 80–24 is also 5 kilocycles per second. The output signal of flip-flop 80–25 is the 2.5 kilocycle per second output signal of the second decade 80–2 of command phase counter 80.

The output signal frequencies of flip-flop 80–31 of decade 80–3 of command phase counter 80 is 1 kilocycle per second or a 1,000 cycles per second. The output signal frequency of flip-flop 80–32 is also 1,000 cycles per second. The output signal frequency of flip-flop 80–34 is 500 cycles per second. The output signal frequency of flip-flop 80–35 is the 250 cycle per second phase shifted carrier signal supplied to conductor 81.

Each flip-flop in the decades of command phase counter 80 provides two output signals, one at the set output terminal and one at the reset output terminal. As previously noted, the pulse train at the reset output terminal is inverted with respect to the pulse train signal at the set output signal terminal.

The 250 cycle per second phase shifted carrier signal from the set output terminal of flip-flop 80–35 of command phase counter 80 is provided to the reset trigger terminal 344–63 of command phase flip-flop 344. When this signal goes from the logic state of 1 to the logic state of 0 it resets command phase flip-flop 344.

The inverted pulse trains from the reset output terminal of flip-flops 80–21, 80–22, 80–24, and 80–25, of decade 80–2 and the inverted pulse trains from the reset output terminals of flip-flops 80–31, 80–32, 80–34, and 80–35, are applied to preset connection board 463. Preset board 463 permits one or more of the inverted pulse train signals to be selectively applied to NAND gate 465 so as to define a portion or point along each 250 cycle per second pulse of the phase shifted carrier signal from command phase counter 80. The definition of the portion or point along the phase shifted carrier signal is obtained in the same general manner as the definition of the last 1/100 of each reference carrier signal pulse described above. However, preset connector board 463 permits the portion of the phase shifted carrier signal pulse so defined to be altered.

Preset board 463 comprises a plurality of horizontal conductors and a plurality of vertical conductors which may be electrically connected by a connector, such as, a screw inserted in the junction of the various conductors. The horizontal conductors are supplied with the inverted pulse train from the reset output terminals of the flip-flops of command phase counter 80. Conductor 467 is connected to the reset output terminal of flip-flip 80–21 to receive the inverted 10 kilocycle per second pulse train. Conductor 468 is connected to the reset output terminal of flip-flop 80–22 to receive the 5 kilocycle per second output pulse train of that flip-flop. Conductor 469 is connected to the reset output terminal of flip-flop 80–24 to receive the 5 kilocycle per second output pulse train of that flip-flop. Conductor 470 is connected to the reset output terminal of flip-flop 80–25 to receive the 2.5 kilocycle per second output signal of flip-flop 80–25. Conductor 472 is connected at a reset output terminal of flip-flop 80–31 to receive the 1 kilocycle per second output pulse train from that flip-flop. Conductor 473 is connected to the reset output terminal of flip-flop 80–32 to receive the 1 kilocycle per second output pulse train therefrom. Conductor 474 is connected to the reset output terminal of flip-flop 80–34 to receive the 500 cycle per second pulse train from that flip-flop. Conductor 475 is connected to the reset output terminal of flip-flop 80–35 so as to be provided with the 250 cycle per second pulse train from that flip-flop.

The pulse signals applied to preset board 463 in conductors 467 through 475 by the aforementioned flip-flops are shown by the graphs in FIG. 10. Each pulse train graph is labelled with the same number as the flip-flop producing it. The numeral adjacent the initiation point 801 of the graphs indicates the conductor in preset board to which the signal is applied.

The vertical conductors 481 to 486 are connected to NAND gate 465, the output of which is connected to NOR gate 477. The output of NOR gate 477 is connected via conductor 479 to the set steering terminal 344–55 of command phase flip-flop 344.

By inserting screws in preset connection board 463 at the junction of the horizontal conductors 467 through 475 and the vertical conductors 481 through 486, any desired combination of the inverted pulse train signals from the flip-flops of command phase counter 80 may be applied to the input of NAND gate 465 so as to select the portion or point of the phase shifted carrier signal of command phase counter 80 by the coincidence of such signals at the input of NAND gate 465. Only when all of the inputs to NAND gate 465 are at the logic state of 0 will a logic 1 output signal issue from the gate. This signal when inverted by NOR gate 477 will provide the 0 logic signal state at the set steering treminal 344–65 necessary to permit command phase flip-flop 344 to be triggered by the appropriate signal in conductor 461.

The reset output terminal 344–53 of command phase flip-flop 344 is connected, via conductor 348, to the set trigger terminal 346–57 of stop Y axis flip-flop 346.

Operation of the absolute position control

When spindle head is below slowdown switch 300, absolute position control circuit 209 is rendered inoperative as its velocity limiting and positioning features are not required. Spindle head 28 moves to positions, and at velocities, commanded by the input signals from the tape reader 64 to control 60.

As an example, assume tape reader 64 has commanded the control 60 to move spindle head 28 upward along ways 30 and the Y axis of the machine tool 20. The commanded position, as evidenced by the count in command position register 70, is greater than the actual position of spindle head 28, as evidenced by the count in the axis position register 72. Comparator 70 provides a logic 1 signal in conductor 75 indicating that the command position is greater than the actual position of spindle head 28. This logic signal is inverted by NOR gate 305 and supplied to the input of NOR gate 306 by conductor 304.

The logic 1 signal in conductor 75 from comparator 74 is inverted by NOR 321 and a logic 0 signal is provided to NOR gate 309 of circuitry 307, via conductors 323 and 325. As absolute position control circuitry is inoperative, there will be a logic 0 signal in conductor 350. This logic 0 signal, when inverted by NOR gate 313, will supply a logic 1 signal to NOR gate 309, causing the output of that gate to NOR gate 315 to be a logic 0 signal. As the count on command position register 70 does not equal the count on axis position register 72, a logic 0 signal is supplied, via conductor 327, from comparator 74 to NOR gate 315. The two logic 0 signals to NOR gate 315 causes the output of this gate to be of the logic 1 signal state. This signal is inverted by NOR gate 317 to provide a logic 0 signal in conductor 303 to NOR gate 306. As both the signals at the inputs of NOR gate 306 are of the logic 0 signal state, a logic 1 signal is provided from the gate to conductor 310.

The logic 1 signal in conductor 310 to NOR gate 308 provides a logic 0 output signal from that gate to conductors 324, 326, and 330, and hence provides a logic 0 signal to NOR gates 318 and 328.

As tool change limit switch 302 is in its normally open position, the input signal to NOR gate 312 is removed, causing that element to provide a logic 1 signal to conductors 316, 320, and 322, to NOR gate 318. This logic 0 signal removes the output signal of NOR gate 318. The logic signal from tool change limit switch 302 is also supplied to command phase flip-flop 344 and stop Y axis flip-flop 346 to block any operation of these elements and force a logic 0 signal in conductor 350 to count control 78.

Slowdown switch 300 is in its normally closed state, providing a logic 1 signal to NOR gate 328. This causes the output of NOR gate 328 to assume the logic 0 signal state.

The logic 0 signal from NOR gate 328 in conductor 336 causes NOR gate 334 to provide a logic 1 signal to conductors 340 and 345. The logic 1 signal in conductor 345 is supplied through NOR gate 341 to conductor 343 and becomes a logic 0 signal. The logic 1 signal in conductor 340 is supplied to NOR gate 338, providing a logic 0 signal from that element, and a logic 1 signal from NOR gate 339 to conductor 386. The logic 0 signal of NOR gate 318 is also supplied to NOR gate 338 via conductor 342, and in addition is supplied to conductor 373. The logic 0 signal in conductor 373 is inverted by NOR gate 375 and provides a logic 1 signal to conductor 374. Thus, conductors 374 and 386 have logic 1 signals applied thereto, while conductors 343 has a logic 0 applied to it.

Turning now to velocity control input circuit 76, the logic signals in the aforesaid conductors are provided to traverse control 382 which selects the desired traverse speed of spindle head 28. If, for example, it is desired to move spindle head 28 at the rapid traverse speed of 3.33 inches per second, traverse control 382 may apply the logic 0 signal in conductor 343 to NAND gate 362 via conductor 384 while applying the logic 1 signals in conductors 386 and 374 to NAND gates 366 and 370, via conductors 388 and 390, respectively.

The pulse trains from feed rate generator 354, corresponding to the rapid traverse speed, the fast traverse speed, and the creep speed, are supplied to NAND gates 362, 366, and 370, respectively. The pulse train from feed rate generator 354, corresponding to the programmed feed rate, is provided to NAND gate 358. All of these pulse trains are comprised of signals alternating between the logic 1 and logic 0 signal states.

Assuming a stop signal is not being applied to conductor 398, a logic 0 signal is supplied to NAND gates 362, 366, and 370, by conductors 400, 402, and 404.

The logic 1 signal applied ot NAND gates 366 and 370 by conductors 388 and 390 blocks those gates so as to prevent the pulse trains corresponding to the fast traverse speed and the creep speed from being applied to NOR gate 406. The logic 0 signal applied to NAND gate 362 by conductor 384, however, unblocks that gate and permits the pulse train corresponding to rapid traverse rate to be applied to NOR gate 406 and conductor 59 to move spindle head 28 at the rapid traverse speed.

Velocity control input circuit 76 may move spindle head 28 at a different desired speed by removing the blocking logic 1 signal to the proper one of NAND gates 358, 362, 366, and 370.

If tape reader 64 provides an input signal which commands spindle head 28 to move in the downward direction, the logic state of the signal from comparator 74 in conductors 75 and 304 becomes a logic 1, since the spindle head is to move in the downward direction rather than the upward direction. This logic 1 signal to conductor 304 and to NOR gate 306 provides a logic 0 signal from this element to NOR gate 308 and causes NOR gate 308 to provide a logic 1 signal to both NOR gate 318 and NOR gate 328.

It may be noted, that the logic 1 signal provided to NOR gates 318 and 328 from NOR gate 308 provides a logic 0 output signal from those elements, regardless of the state of the signals from slowdown switch 300 and tool change limit switch 302, thereby disabling absolute position control circuit 200. Spindle head 28 may move downward at any velocity, regardless of its position along ways 30 and the Y axis, since when spindle head 28 is moving downward there is no danger of the spindle head hitting the stops at the upper limit of ways 30. Thus, as shown in FIG. 7, spindle head 28 may move either up or down below slowdown switch 300 at any velocity, including the 3.33 inches per second rapid traverse speed.

Absolute position control circuit 200 is rendered operative by an input signal from tape reader 64 commanding machine tool 20 to move to a relative position in excess of, or beyond, the desired absolute position. Such a position command may be in excess of the point of maximum upper travel of spindle head 28 along ways 30 plus any offset compensating adjustments to control 60. For example, the spindle head may be commanded to move to a relative position 99 inches along the Y axis. This position command is in excess of the 16 inch length of ways 30. Without the imposition of absolute position control circuit 200, spindle head 28 would attempt to go to such a position and would be halted only by striking the stops 31 at the ends of the ways 30. With absolute position control circuit 200, however, the desired absolute position, for example, 16.000 inches along the Y axis, is established and the spindle head stopped at that position as it proceeds along the ways in an effort to attain the excessive commanded position.

The velocity control circuitry of absolute position control 200 insures that the speed of spindle head 28 is reduced as it approaches the desired absolute position so that accurate positioning may occur. Thus, when spindle head 28 moves to within 1.25 inches of the desired absolute point along ways 30, slowdown switch 300 is actuated. In the instance where the desired absolute position is the point of maximum upper travel along ways 30, slowdown switch 300 will be 1.25 inches from that position or 14.75 inches along ways 30. The actuation of slowdown switch 300, in turn, actuates absolute position control 200 to reduce the velocity of the spindle head as it approaches the desired absolute position.

When spindle head 28 actuates slowdown switch 300, the normally closed switch is opened. This removes the input signal from that switch to NOR gate 328 and provides a logic 0 signal to the gate. NOR gate 328 provides a logic 1 signal to conductor 336 as a logic 0 signal is supplied to NOR gate 328 by NOR gate 308. The logic 1 signal of NOR gate 328 provides a logic 0 signal from NOR gate 334 to NOR gates 338 and 341. The logic 0 signal to NOR gate 341 is inverted by that gate to provide a logic 1 signal in conductor 343. The logic 0 signal to NOR gate 338 provides a logic 1 signal out of that gate as the signal from NOR gate 318 to NOR gate 338 is also a logic 0 signal. The logic 1 signal out of NOR gate 338 is inverted by NOR gate 339 and provided to conductor 386.

The logic 1 signal in conductor 343 is applied by traverse control 382 to NAND gate 362, via conductor 384 so as to block that gate and remove the pulse train corresponding to the rapid traverse speed from NOR gate 406 and count control 78.

The logic 0 signal in conductor 386 is applied by traverse control 382 to NAND gate 366, vit conductor 388, so as to unblock that gate and apply the pulse train from feed rate generator 354 corresponding to the fast traverse speed of 1 inch per second to NOR gate 406 and count control 78, via conductor 59. Count control 78 operates command phase counter 80 so as to move spindle head 28 upward along ways 30 and the Y axis of machine tool 20 at the fast traverse speed of 1 inch per second above slowdown switch 300.

As spindle head 28 approaches to within .075 inch of the desired absolute position, the spindle head strikes and actuates tool change limit switch 302. In the instance where the desired absolute position is the point of maximum upper travel along ways 30 measuring 16.000 inches, spindle head 28 will actuate tool change limit switch 302 when it is 15.925 inches along ways 30. The actuation of tool change limit switch 302 by spindle head 28 closes the normally opened switch and supplies a signal to NOR gate 312, providing a logic 0 signal from the gate. The logic 0 signal of NOR gate 312 is supplied via conductors 316, 320, and 322, to NOR gate 318. The logic 0 signal is also supplied to command phase flip-flop 344 and stop Y axis flip-flop 346, as hereinafter described.

The logic 0 signal from NOR gate 312 in conductor 322 provides a logic 1 signal from NOR gate 318, as NOR gate 308 provides a logic 0 signal to NOR gate 318 via conductor 326. The logic 1 signal from NOR gate 318 is supplied, via conductors 342 and 373, to NOR gate 375 to provide a logic 0 output signal from that element to conductor 374.

The logic 1 signal from NOR gate 318 is also supplied to NOR gate 338 and provides a logic 0 signal from that element to NOR gate 339 and a logic 1 signal in conductor 386.

The logic 1 signal in conductor 386 is applied by traverse control to NAND gate 366, via conductor 388, so as to block that gate and remove the pulse train corresponding to the fast traverse speed from NOR gate 406 and count control 78.

The logic 0 signal in conductor 374 from NOR gate 375 is applied by traverse control 382 to NAND gate 370, via conductor 390, so as to unblock that gate and apply the pulse train from feed rate generator 354 corresponding to the creep speed of .067 inch per second to NOR gate 406 and count control 78 via conductor 59. Count control 78 supplies the pulse train to command phase counter 80 to move spindle head 28 at the .067 inch per second rate. Thus, the velocity of spindle head 28 cannot exceed .067 inch per second in the upward direction along ways 30 above tool change limit switch 302.

Turning now to the operation of absolute position control circuit 200 in positioning spindle head 28 at the desired absolute position along the Y axis of machining tool 20 and at the point of maximum upper travel along ways 30, the position control circuit of absolute position control 200 will initially be described without the use of connectors or screws in preset board 463. As hereinafter described, preset board 463 is used to alter the operation of absolute position control circuit 200 in positioning spindle head 28 at the desired absolute position. Due to numerous factors, such as improper alignment of the actuating means 88 and sensor 86 of transducer 84, lagging errors in the electro-mechanical portions of machine tool 20 such as servo valve 112, and errors in the mechanical parts such as hydraulic motor 55, it is generally not possible to predict, with the necessary degree of accuracy, the exact point at which absolute position control circuit 200 will stop spindle head 28. The simplest and most direct approach to the absolute positioning of spindle head 28 on any given machine tool having error factors of undetermined magnitudes, is to operate absolute position control circuit 200 and observe where the circuit stops spindle head 28. Alterations are then made by means of preset board 463 so that the absolute position control circuit stops spindle head 28 in the desired absolute position. Alterations may be made to the position of switch 302, but the use of preset board 463 preferred.

As long as tool change limit switch 302 is in the open or unactuated state, logic 1 signal will be supplied from NOR gate 312 to the reset input terminal 346–65 of stop Y axis flip-flop 346 to provide a logic 0 signal from set output terminal 346–51 to conductor 350. This logic 0 signal indicates to control 60 that spindle head 28 is not at the desired absolute position along the Y axis of machine tool 20.

The logic 1 signal from NOR gate 312 is also supplied to the reset steering input terminal 344–61 of command phase flip-flop 344. This signal causes command phase flip-flop to remain in the set condition, that is, with a logic 0 signal at the reset output terminal of the flip-flop. Thus, a logic 0 signal is provided in conductor 348.

When tool change limit switch 302 is actuated and closed by spindle head 28, the output of NOR gate 312 becomes a logic 0 signal. NOR gate 312 is connected to command phase flip-flop 344 by conductors 316 and 347. The change in the logic state of the signal at reset steering terminal 344–61 from logic 1 to logic 0 places command phase flip-flop 344 in a condition in which it may be placed in the reset state by a reset trigger signal at terminal 344–63. The logic 0 signal supplied by NOR gate 312 to the reset input terminal of flip-flop 346 by conductor 349 unblocks that flip-flop and permits it to be placed in the set state by appropriate signals to set steering terminal 346–55 and set trigger terminal 346–57.

The reset trigger signal to command phase flip-flop 344 is comprised of the phase shifted 250 cycle per second carrier signal pulse train from the set output terminal of flip-flop 80–35 of command phase counter 80 in conductor 81. As previously noted, this pulse train is a signal alternating between the logic 1 and logic 0 signal states and is inverted with respect to the 250 cycle per second carrier signal pulse train from reference counter 68. The period of both carrier signal pulse trains is 4 milliseconds.

Thus, sometime during a 4 millisecond period immediately subsequent to the closing of tool change limit switch 302 and logic 1 to logic 0 signal change on the reset steering terminal 344–61 of command phase flip-flop 344, the 250 cycle per second signal in conductor 81 to reset trigger terminal 344–63 will go through a logic 1 to logic 0 signal state change. This will then trigger command phase flip-flop 344 to the reset condition, providing a logic 1 signal at reset output terminal 344–63.

On the set side of the flip-flop, the set steering signal at set steering terminal 344–51 of command phase flip-flop 344 is continually at the logic 0 signal state, due to the absence of any screws or connectors joining the conductors of preset board 463. Without screws in preset board 463, vertical conductors 481 through 486 all provide logic 0 signals to NAND gate 564, causing the output of that gate to be a logic 1 signal. The logic 1 signal is inverted by NOR gate 477 to a logic 0 signal and supplied to set steering terminal 344–55 of flip-flop 344 by conductor 479. Thus, the set side of flip-flop 344 is continually in a condition in which the flip-flop may be placed in the set state by a trigger signal at terminal 344–57.

The set trigger signal applied to set trigger terminal 344–57 by conductor 461 is the 25 kilocycle per second signal from flip-flop 80–18 of command phase counter 80. As noted, this signal in conductor 461 goes from a logic 1 signal to a logic 0 signal on the eighth pulse of every ten clock oscillator 66 pulses. As the logic 1 to logic 0 signal state change of the 250 cycle per second phase shifted carrier signals pulse train applied by conductor 81 to the reset trigger terminal 344–63 was caused by the initiation of a group of ten clock oscillator pulses and the divide by 1,000 operation of command phase counter 80. Eight clock oscillator pulses, or 32 microseconds, after the 250 cycle per second carrier signal triggers flip-flop 344 into the reset state, the signal state in conductor 461 applied to the set trigger terminal 344–57 goes through a logic 1 to logic 0 signal state change and triggers flip-flop 344 back to the set state. This causes the reset output signal at reset output terminal 344–53 to go from the logic state of 1 to the logic state of 0.

It will be appreciated, that the above described sequential change from the set to the reset and back to the set state of command phase flip-flop 344 will be repeated every 4 milliseconds after tool change limit switch 302 has been actuated, due to the periodic nature of the 250 cycle per second signal applied to the reset trigger terminal 344–63 of command phase flip-flop 344.

The set steering signal to set steering terminal 346–55 of stop Y axis flip-flop 346 comprises the signal from flip-flop 420 which is at the logic state of 0 only during the last $\frac{1}{100}$ of each pulse of the reference carrier signal pulse train from reference counter 68. The phase of this carrier signal is not phase shifted but remains constant, as does the periodic occurrence of the logic 0 signal state at set steering terminal 346–55. This set steering signal places flip-flop 346 in a condition in which the flip-flop may be triggered into the set state by a trigger signal at terminal 346–57 only during the last $\frac{1}{100}$ of each reference carrier signal pulse.

As spindle head 28 proceeds along ways 30, it is propelled by the constant phase shifting of the carrier signal pulse train of command phase counter 80 with respect to the reference carrier signal from reference counter 68. At some time, the phase shifted carrier signal of command phase counter 80 will be phase shifted to a point at which the 25 kilocycle per second set trigger signal at set trigger terminal 344–57 of command phase flip-flop 344 will move flip-flop 344 from the reset to the set state shortly after the set steering signal in conductor 418 to stop Y axis-flop 346 has gone to the logic 0 signal state. The logic 1 to logic 0 signal state change in conductor 348 from reset output terminal 344–53 applied to the set trigger terminal 346–57 of stop Y axis flip-flop 346 after the logic 0 signal in conductor 418 appears at the set steering terminal 346–55, changes flip-flop 346 from the reset state to the set state, providing a logic 1 signal to conductor 350. The signal, when applied to count control 78, stops the flow of pulses from count control 78 to command phase counter 80, bringing spindle head 28 to a stop.

The set steering signal at set steering terminal 346-55 must go to a logic 0 signal state approximately 1 microsecond prior to the time the set trigger terminal 346–57 goes from the logic 1 to logic 0 signal state.

As previously noted, the exact point at which spindle head 28 will stop is difficult to predict, due to the various error factors inherent in machine tool 20. The stopping point will, of course, be within .1 inch of the desired absolute position, such as the point of maximum upward travel along ways 30, since tool change limit switch 302 is located with .1 inch, i.e. .075 inch, of the desired position. As .1 inch of movement of spindle head 28 represents 1,000 clock oscillator 66 pulses, the stopping point of spindle head 28 will be within 1,000 pulses of clock oscillator 66. Each clock oscillator 66 pulse represents .0001 inch of movement of spindle head 28.

After determining the position at which the operation of absolute position control circuit 200 stops spindle head 28, the difference between that position and the desired absolute position may be measured, by an optical gauge or other means. Screws or connectors are then inserted in preset board 463 to alter the operation of absolute position control 200 in accordance with such difference so as to stop spindle head 28 in the desired absolute position.

The insertion of screws into preset board 463 alters the application of the set steering signal to set steering terminal 344–55 of command phase flip-flop 344 and hence the point at which the command phase flip-flop 344 goes to the set state, triggering stop Y axis flip-flop 346 and stopping spindle head 28. In the normal instance, wherein spindle head 28 stops short of the desired absolute position, the application of the set steering signal to flip-flop 344 is delayed by the interval necessary for spindle head 28 to move into the desired absolute position.

The delayed application of the set steering signal to set steering terminal 344–55 of command phase flip-flop 344 is obtained by defining a point on the phase shifted 250 cycle per second carrier signal pulse train from command phase counter 80 in much the same manner as the desired point on the reference counter 80 reference carrier signal is defined by flip-flop 422. A plurality of the pulse train signals generated by command phase counter 80 in the production of the 250 cycle per second carrier signal pulse train are supplied to a gate. The gate is operable by a coincidence in the logic states of the pulse trains signals to define the point on the carrier signal. Preset board 463 provides for the selection and supply of the pulse signals from flip-flops 80–21, 80–22, 80–24, 80–25, 80–31, 80–32, 80–34, and 80–35, to NAND gate 465 which defines the desired point of the phase shifted carrier signal pulse train of command phase counter 80. The pulse signals are supplied to preset board 463 from the reset output terminals of the flip-flops.

For example, assume spindle head 28 stops .05 inch short of the desired position, or at 15.950 inches along ways 30. This .05 inch difference between the desired absolute position of 16.000 inches along ways 30 and the stopping position of 15.590 inches along ways 30 represents a phase shifting of the carrier signal from command phase counter 80 with respect to the reference carrier signal from reference counter 68 of 500 pulses from clock oscillator 66 and hence it is necessary to delay the application of the set steering signal to command phase flip-flp 344 by an interval of 500 clock oscillator pulses. This delay is obtained by inserting a screw in preset board 463 at the junction of horizontal conductor 475 and vertical conductor 483, so as to supply the signal in conductor 475 to NAND gate 465.

The effect of the insertion of a screw at the junction of conductor 483 and conductor 475 is shown in FIG. 10. This figure shows one complete pulse signal of the phase shifted 250 cycle per second carrier signal of command phase counter 80, indicated by the graph 800. As this pulse is produced by the divide by 1,000 operation of command phase counter 80 on the 250 kilocycle per second clock oscillator 66 pulse train, it represents 1,000 clock oscillator pulses. The remainder of the graph of FIG. 10 shows the pulse train output signals of the aforementioned flip-flops of command phase counter 80 and are labelled with identical numerals. FIG. 10 also shows the set trigger signal applied to terminal 344–57 of command phase flip-flop 344 in conductor 461. This 25 kilocycle per second signal is produced by flip-flop 80–15 and labelled with the same number.

The pulse train signal produced at the set output terminal of flip-flop 80–35 is the phase shifted carrier signal pulse train 800 of command phase counter 80. The 250 cycle per second signal produced at the reset output terminal of the flip-flop is indicated by the numeral 80–35 in FIG. 10 and is inverted with respect to pulse train 800. This inversion represents a phase shift of half a 250 cycle per second pulse or a phase shift of 500 clock oscillator pulses. Thus, pulse signal 80–35 goes through a logic 1 to logic 0 signal state change 500 pulses later than does the carrier signal 800 of command phase counter 80. Prior to the signal change pulse signal 80–35 is of the logic state of 1.

When a screw is inserted at the junction of conductors 483 and 475, pulse signal 80–35 is supplied to one of the inputs of NAND gate 465, causing the output of that gate to be a logic 1 signal for the first 500 counts of the carrier signal pulse 800. This causes the output of the gate to be a logic 0 signal and a logic 1 signal to be applied to set steering terminal 344–55 of flip-flop 344 preventing the flip-flop from being set.

At the end of the 500 pulse delay, or a point 802 of FIG. 10, pulse 80–35 goes to the logic 0 state permitting flip-flop 344 to be triggered into the set state and operating stop Y axis flip-flop 346 to bring the movement of spindle head 28 to a halt. As the operation of flip-flop 346 has been delayed 500 counts, the movement of spindle head 28 has been advanced .05 inch, so that it stops in the desired absolute position of 16.000 inches rather than the 15.950 inch position. The signal applied to set steering terminal 344–55 is shown by graph 803.

In a like manner, the operation of stop Y axis flip-flop may be delayed any amount by the insertion of screws in preset board 463. For example, if spindle head 28 stops .049 inch short of the desired position, the operation of flip-flop 346 must be delayed 510 clock oscillator 66 pulses. A screw is inserted in preset board 463 to connect conductor 475 to conductor 483 and NAND gate 465. This gives a 500 clock oscillator pulse delay, as explained above. A screw is also inserted in printed board 463 to connect conductor 467 to conductor 484 so as to provide the pulse train output signal of command phase counter flip-flop 80–21 to NAND gate 465. As will be noted from an inspection from FIG. 9, the pulse train signal 80–21 goes from the logic 1 signal state to the logic 0 signal state 10 counts after pulse signal 80–35 has gone to the logic 0 state or at point 804. At this time then, the output of NAND gate 465 will go to a logic 1 state, applying a logic 0 signal to set steering terminal 344–55 and allowing command phase flip-flop 344 to be triggered to the set state, operating stop Y axis flip-flop 346 to stop a movement of spindle head 28 along the Y axis. The signal applied to set steering terminal 344–55 is shown by graph 805. The total amount of the delayed operation of stop Y axis flip-flop 346 is 510 counts, permitting spindle head 28 to travel .051 inch further along ways 30 so as to stop at the desired absolute position of 16.000 inches.

When stop Y axis flip-flop 346 provides a logic 1 output signal to count control 78, stopping the movement of spindle head 28; the logic 1 signal in conductor 350 is supplied to conductor 311, inverted by NOR gate 313, and supplied as a logic 0 signal to NOR gate 309 of circuitry 307. As control 60 is still under a command from tape reader 64 to move spindle head 28 upward, even though it has been overridden by absolute position control circuit 200, a logic 0 signal is also supplied to NOR gate 309 from conductor 323. This causes the output of NOR gate 309 to be a logic 1 signal, the output of NOR gate 315 to be a logic 0 signal, and the output of NOR gate 317 to be a logic 1 signal. This logic 1 signal is a false in position signal as it indicates to absolute position control 200 and control 60 that spindle head 28 is in the commanded relative position, when actually spindle head 28 is in the desired absolute position. The logic 1 false in position signal, when applied to NOR gate 306, provides a logic 1 signal out of NOR gate 308 to NOR gates 318 and 328, which prevents further operation of absolute position control 200.

It will be appreciated that modifications and alterations may be made to the above described embodiment of the invention without departing from the spirit of the invention. For example, other types of logic elements and circuits components may be used in place of those described above. It is intended to cover in the appended claims, all such modifications and alterations as fall within the true spirit and scope of the invention.

I claim:

1. In a machine tool having an element movable on an axis of said machine tool, said element positionable along said axis at a reference point on said machine tool, said machine tool having a control for moving and positioning said element along said axis with respect to a reference point on said axis and with respect to a reference point on said machine tool, said control being subject to compensating adjustments to alter the reference point on said axis and thereby preventing said control from positioning said element along said axis at the reference point on said machine tool;

a position control circuit connected to said machine tool control and operable to override the positioning of said element by said control to position said element along said axis at the reference point on the machine tool;

a sensing means mounted on said machine tool, said sensing means actuatable by the movement of said element along said axis to sense the movements of said element;

a first means in said position control circuit operably connected to be actuated by said sensing means, said first means connected to said control and responsive to the movement of said element along said axis by said control to periodically provide an output signal, the moment of periodic provision of said output signal being proportional to the movement of said element; and, a second means in said position control circuit operably connected to said first means and to said control and cyclically providing a period during which said second means may supply a signal to said control to stop the movement of said element in response to an output signal from said first means, said cyclical provision of said period by said second means being independent of the movement of said element along said axis by said control, whereby said second means supplying said signal to said control to stop the movement of said element when the cyclically provided period of said second means coincides with the moment of periodic provision of said output signal by said first means, the coincidence of said period and output signal, and the stopping of said element, occurring when said element has been positioned by said machine tool control at said reference point on said machine tool.

2. The position control circuit according to claim 1 wherein said sensing means is mounted on said machine tool at a known position with respect to the reference point on said machine, the coincidence of said period of said second means with the moment of periodic provision of said output signal occurring when said element has been moved by said machine tool control to the determinable position with respect to said sensing means.

3. The position control circuit according to claim 1 wherein said first means includes a delay means to alter the moment of periodic provision of said output signal by said first means and to alter the coincidence of said period of said second means with the moment of periodic provision of said output signal and the stopping of said element, so as to position said element along said axis at said reference point on said machine tool.

4. The position control circuit according to claim 1 wherein said second means is connected to said sensing means to cyclically provide said period only when said sensing means is actuated.

5. The position control circuit according to claim 1 wherein said control for said machine tool moves said element along said axis in a series of incremental movements by phase shifting a phase shiftable pulse signal with respect to a constant phase reference pulse signal by amounts proportional to said movements, said first means being responsive to the application of said phase shiftable pulse signal to said first means to periodically provide said output signal, the moment of periodic provision of said output signal being proportional to the phase shifting of said phase shiftable pulse signal, said second means being responsive to the application of said constant phase reference pulse signal to said second means to cyclically provide said period independently of the serially incremental movement of said element by said control.

6. The position control circuit according to claim 5 including a delay means connected to said first means and to said control to alter the movement of periodic provision of said output signal by said first means and to alter the coincidence of said period of said second means with the moment of periodic provision of said output signal and the stopping of said element along said axis so as to position said element along said axis at said reference point on sad machine tool, said delay means being energized by said phase shiftable pulse signal of said control and delaying the application of said phase shiftable signal to said first means and the moment of periodic provision of said output signal.

7. The position control circuit according to claim 5 including a selection means connected to said second means to said control, said selection means being energized by said constant phase reference pulse signal of said control and controlling the application of said constant phase reference pulse signal to cyclically provide said period once each constant phase reference pulse signal, and to define said period as a portion of said reference pulse signal.

8. The position control circuit according to claim 5 wherein said first means comprises a steerable logic element capable of being triggered into a state of providing an output signal by the application of a signal thereto, said logic element being steered by the actuation of said sensing means and being triggered into a state of periodically providing said output signal by the application of said phase shiftable pulse signal.

9. The position control circuit according to claim 5 wherein said second means comprises a logic element steerable by the application of a steering signal to provide a period wherein the application of a trigger signal thereto will provide a signal from said element, said logic element comprising said second means being steered by said reference signal and triggered by said output signal of said first means, the application of said reference signal cyclically providing said period during which said logic element may provide a signal to said control in response to an output signal from said first means.

10. In a machine tool having an element movable on an axis of said machine tool, said element positionable along said axis at a reference point on said machine tool, said machine tool having a control for moving and positioning said element along said axis with respect to a reference point on said axis and with respect to a reference point on said machine tool, said control being subject to compensating adjustments to alter the reference point on said axis, and thereby preventing said control from positioning said element along said axis at the reference point on said machine tool;

a position control circuit connected to said machine tool control and operable to override the positioning of said element by said machine tool control to position said element along said axis at the reference point on the machine tool;

means in said position control circuit to define said reference point on the machine tool independently of said machine tool control so as to ascertain the positioning said element at said machine tool reference point by said control;

a first means in said position control circuit responsive to the movement and positioning of said element by said control and providing a signal corresponding to the positioning of said element by said control;

a second means in said position control circuit defining said reference point on said machine tool and operable by said signal from said first means to ascertain the positioning of said element by said control at said reference point to override the positioning of said element by said control; and said control being operable to move and position said element along said axis in a series of incremental movements by phase shifting a phase shiftable pulse signal with respect to a constant phase reference pulse signal, and said first means being responsive to said phase shiftable pulse signal and operable to provide a signal corresponding to the positioning of said element by said control, said second means being operable in response to said reference pulse signal and to said means defining said reference point to ascertain the positioning of said element by said control at said reference point by said control and to override the positioning of said element by said control.

11. In a machine tool having an element supported for movement along an axis, said element positionable along said axis at a reference point on said machine tool;
   a machine tool control operable to move and position said element along said axis, said machine tool control being subject to compensating adjustments altering the reference point on said axis, said adjustments preventing said machine tool control from positioning said element along said axis at the reference point on said machine tool;
   a position control circuit connected to said machine tool control and operable to override the positioning of said element by said machine tool control to position said element along said axis at the reference point on the machine tool; and,
   control means in said position control circuit operable to reduce the movement per unit time of said element by said machine tool control so as to permit positioning of said element along said axis at the reference point on said machine tool.

12. In a machine tool having an element movable on an axis of said machine tool, said element positionable along said axis at a reference point on said machine tool, said machine tool having a machine control for moving and positioning said element along said axis with respect to a reference point on said axis and with respect to a reference point on said machine tool, said machine control being subject to compensating adjustments altering the reference point on said axis, said adjustments preventing said machine control from positioning said element along said axis at the reference point on said machine;
   a position control circuit connected to said machine control and operable to override the positioning of said element by said machine control to position said element along said axis at the reference point on the machine tool;
   circuit means in said position control circuit connected to the machine control and responsive to the moving and positioning of said element by said machine control to ascertain the positioning of said element by said machine control at said reference point on the machine tool by the coincidence of a periodically provided signal proportional to the movement of said element by said machine control and a cyclically provided period, the provision of which is independent of the movement of said element by said machine control; and,
   control means in said circuit means to reduce the movement per unit time of said element by said machine control so as to permit positioning of said element along said axis at the reference point on said machine tool.

13. The position control circuit according to claim 12 wherein said circuit means to ascertain the positioning of said element includes a sensing means actuatable by the movement of said element along said axis to provide signals to said position control circuit in response to the actuation of said sensing means to reduce the movement per unit line of said element along said axis.

14. The position control circuit according to claim 13 wherein said sensing means includes a pair of switches mounted on said machine tool and actuatable by the movement of said element along said axis to provide signals to said position control circuit in response to the actuation of said switches to reduce the movement per unit of time of said element along said axis in two steps.

References Cited

UNITED STATES PATENTS

| 3,209,222 | 9/1965 | Holy | 318—28 |
| 3,211,896 | 10/1965 | Evans et al. | 318—162 XR |
| 3,400,314 | 9/1968 | Wilson | 318—28 XR |
| 3,343,053 | 9/1967 | Toscano et al. | 318—18 |
| 3,349,229 | 10/1967 | Evans | 318—18 XR |

BENJAMIN DOBECK, Primary Examiner

U.S. Cl. X.R.

318—28, 30